US012735537B2

(12) United States Patent
Baker et al.

(10) Patent No.: US 12,735,537 B2
(45) Date of Patent: Sep. 15, 2026

(54) URETHANE-CROSSLINKED POLYMERIC MICROPARTICLES AND PROCESSES OF MANUFACTURING THE SAME

(71) Applicant: THE SECANT GROUP, LLC, Telford, PA (US)

(72) Inventors: Manasi Chawathe Baker, Ambler, PA (US); Stephanie Reed, Conshohocken, PA (US)

(73) Assignee: The Secant Group, LLC, Telford, PA (US)

( * ) Notice: Subject to any disclaimer, the term of this patent is extended or adjusted under 35 U.S.C. 154(b) by 820 days.

(21) Appl. No.: 18/173,404

(22) Filed: Feb. 23, 2023

(65) Prior Publication Data

US 2023/0265249 A1 Aug. 24, 2023

Related U.S. Application Data

(60) Provisional application No. 63/268,464, filed on Feb. 24, 2022.

(51) Int. Cl.
*C08J 5/02* (2006.01)
*A61K 9/16* (2006.01)
(Continued)

(52) U.S. Cl.
CPC ............. *C08J 5/02* (2013.01); *C08J 2367/02* (2013.01)

(58) Field of Classification Search
None
See application file for complete search history.

(56) References Cited

U.S. PATENT DOCUMENTS

2018/0280912 A1 10/2018 Lu et al.
2020/0061240 A1 2/2020 Reed et al.

FOREIGN PATENT DOCUMENTS

JP 2021053594 A * 4/2021
WO 2017147457 A2 8/2017
(Continued)

OTHER PUBLICATIONS

Frydrych et al., “Thermoresponsive, stretchable, biodegradable and biocompatible poly(glycerol sebacate)-based polyurethane hydrogels,” Polymer Chemistry, vol. 6, pp. 7974-7987, (2015), and attached Electronic Supplementary Material (ESI), p. 1-15. (Year: 2015).*
(Continued)

*Primary Examiner* — Ha S Nguyen
(74) *Attorney, Agent, or Firm* — McNees Wallace & Nurick LLC

(57) ABSTRACT

A first process produces poly(glycerol sebacate) urethane (PGSU)-based microparticles. The first process includes forming a first composition including a poly(glycerol sebacate) (PGS) resin and dispersing the first composition in a continuous fluid phase in the presence of an isocyanate crosslinker to produce PGSU-based microparticles. A second process also produces PGSU-based microparticles. The second process includes forming a first composition including a PGS resin, forming a second composition and combining the first composition and the second composition to produce PGSU-based microparticles, where at least one of the first and the second composition includes an isocyanate crosslinker. An extrusion-spheronization process of crosslinking includes extruding an extrudate including a crosslinkable compound into a continuous fluid phase in a spheronization bath and dispersing the extrudate in the continuous fluid phase to crosslink the crosslinkable com-
(Continued)

pound, where at least one of the extrudate and the continuous fluid phase includes a crosslinker.

19 Claims, 14 Drawing Sheets

(51) Int. Cl.

| | |
|---|---|
| ***A61K 31/573*** | (2006.01) |
| ***C08G 18/08*** | (2006.01) |
| ***C08G 18/24*** | (2006.01) |
| ***C08G 18/42*** | (2006.01) |
| ***C08G 18/73*** | (2006.01) |
| ***C08J 3/12*** | (2006.01) |
| ***C08J 3/24*** | (2006.01) |

(56) References Cited

FOREIGN PATENT DOCUMENTS

| | | | |
|---|---|---|---|
| WO | 2018183856 | A1 | 10/2018 |
| WO | 2020041489 | A1 | 2/2020 |
| WO | 2022005737 | A1 | 1/2022 |
| WO | 2022026116 | A1 | 2/2022 |

OTHER PUBLICATIONS

Varde et al., "Microspheres for controlled release drug delivery," Expert Opinion on Biolgoical Therapy, vol. 4(1), pp. 35-51 (2004). (Year: 2004).*

Baker et al., "Biodegradable Hydralese (PGSU) (poly(glycerol sebacate) urethane) Microspheres for Controlled Release of Water-soluble Drugs", 2021 AAPS PharmSci 360 Conference, Philadelphia, PA, Oct. 17-21, 2021.

Chawathe et al., "Biodegradable Hydralese (PGSU) (poly(glycerol sebacate) urethane) Microspheres for Controlled Drug Delivery", 2020 AAPS PharmSci 360 Meeting, Virtual, Oct. 26-Nov. 5, 2020.

Chegini et al., "Poly (glycerol sebacate) nanoparticles for ocular delivery of sunitinib: physicochemical, cytotoxic and allergic studies", IET nanobiotechnology, vol. 13, pp. 974-982, 2019.

Desai et al., "Self-assembled, ellipsoidal polymeric nanoparticles for intracellular delivery of therapeutics", Journal of Biomedical Materials Research Part A, vol. 106, pp. 2048-2058, 2018.

Frydrych et al., "Thermoresponsive, stretchable, biodegradable and biocompatible poly(glycerol sebacate)-based polyurethane hydrogels", Polymer Chemistry, vol. 6, pp. 7974-7987, 2015.

Louage et al., "Poly (glycerol sebacate) nanoparticles for encapsulation of hydrophobic anti-cancer drugs", Polymer Chemistry, vol. 8, pp. 5033-5038, 2017.

Sivanesan et al., "5FU encapsulated polyglycerol sebacate nanoparticles as anti-cancer drug carriers", RSC Advances, vol. 11, pp. 18984-18993, 2021.

* cited by examiner

URETHANE-CROSSLINKED POLYMERIC MICROPARTICLES AND PROCESSES OF MANUFACTURING THE SAME

CROSS-REFERENCE TO RELATED APPLICATIONS

This application claims priority to and the benefit of U.S. Provisional Application No. 63/268,464, filed Feb. 24, 2022, which is hereby incorporated by reference in its entirety.

FIELD OF THE INVENTION

The present disclosure is generally directed to poly(glycerol sebacate urethane) (PGSU)-based microparticles and processes of manufacture and uses thereof. More specifically, the present disclosure is directed to processes of manufacture of PGSU-based microparticles from poly(glycerol sebacate) resin and crosslinker and compositions formed by such processes.

BACKGROUND OF THE INVENTION

Long-acting injectable (LAI) microspheres are being developed for sustained delivery of an active pharmaceutical ingredient (API). LAIs help improve the bioavailability of the API at the desired target site, the shelf-life and stability of the API in the formulation, and patient compliance. In recent years, polyesters such as polylactide-co-glycolide (PLGA), polylactide (PLA), and polycaprolactone (PCL) have been utilized to manufacture microparticles for controlled delivery of APIs, improve therapeutic efficacy, and reduce frequency of dosing. However, a major concern with PLGA, PLA, and PCL is the acidic microenvironment caused by their degradation products, which may lead to unfavorable tissue reactions in situ or may negatively impact the releasing APIs.

Soluble thermoplastic polymers, such as PLGA, PLA, and PCL, are conventionally dissolved in solvent and processed into microparticles using an oil-in-water (o/w) emulsion or a water-in-oil-in-water (w/o/w) double emulsion technique. Crosslinkable thermoset polymers are not conventionally processed into microparticles, due to their lack of ability to be solvated once cured, and so traditional o/w and w/o/w emulsions are not possible with such polymers. Therefore, different processes must be developed to adapt thermoset polymers with crosslinking chemistries to make the formulations amenable to microsphere emulsion while still achieving curing.

BRIEF DESCRIPTION OF THE INVENTION

In some embodiments, a process of producing poly(glycerol sebacate) urethane (PGSU)-based microparticles includes forming a first composition including a resin of poly(glycerol sebacate) and dispersing the first composition in a continuous fluid phase in the presence of a crosslinker to produce the PGSU-based microparticles.

In some embodiments, a process of producing poly(glycerol sebacate) urethane (PGSU)-based microparticles includes forming a first composition including a resin of poly(glycerol sebacate) and forming a second composition. At least one of the first composition and the second composition includes a crosslinker. The process also includes combining the first composition and the second composition to produce the PGSU-based microparticles.

In some embodiments, an extrusion-spheronization process of crosslinking includes extruding an extrudate including a crosslinkable compound into a continuous fluid phase in a spheronization bath and dispersing the extrudate in the continuous fluid phase in the spheronization bath to crosslink the crosslinkable compound, where at least one of the extrudate and the continuous fluid phase includes a crosslinker.

In some embodiments, a composition includes a plurality of poly(glycerol sebacate) urethane (PGSU)-based microparticles.

In some embodiments, a poly(glycerol sebacate) composition dispersed in a continuous fluid phase is formed by an oil-in-oil (o/o) emulsion technique.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
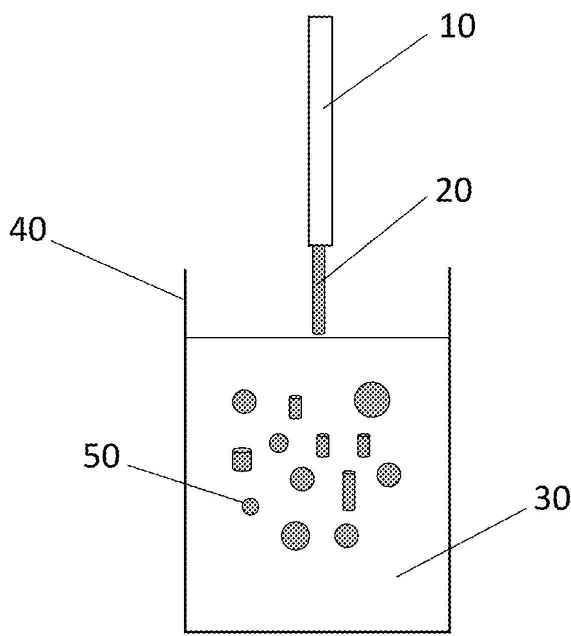
FIG. 1 schematically shows an extrusion-spheronization process in an embodiment of the present disclosure.

Provided are urethane-crosslinked polymeric microparticles.

Also provided are processes of manufacturing urethane-crosslinked polymeric microparticles.

In some embodiments, the urethane-crosslinked polymeric microparticles include copolymer of a polyol and a polyacid in the form of poly(polyol-polyacid) urethane-based microparticles. Although described herein primarily as PGSU-based microparticles, the polymeric microparticles may be any urethane-crosslinked polymeric microparticles.

Appropriate polyol monomers may include, but are not limited to, glycerol, low molecular weight PEG (about 1000 Da or less), propane diol, polyvinyl alcohol, xylitol, mannitol, sorbitol, maltitol, erythritol, or isomalt. In exemplary embodiments, the polyol monomer includes glycerol. When more than one polyol monomer is copolymerized with a polyacid monomer, they may be included at any molar ratio in the range of 1:99 to 50:50.

In some embodiments, the polyacid monomer is a diacid monomer. In some embodiments, the diacid monomer has the general formula $[HOOC(CH_2)_nCOOH]$, where n=1-30. In other embodiments, the polyacid monomer has more than two carboxylic acid functional groups, such as, for example, citric acid. Appropriate polyacid monomers may include, but are not limited to, malonic acid, malic acid, fumaric acid, oxaloacetic acid, succinic acid, glutaric acid, adipic acid, pimelic acid, suberic acid, azelaic acid, citric acid, isocitric acid, tartaric acid, itaconic acid, or sebacic acid. In exemplary embodiments, the polyacid monomer includes sebacic acid. When more than one polyacid monomer is copolymerized with a polyol monomer, they may be included at any molar ratio in the range of 1:99 to 50:50.

In exemplary embodiments, the process includes forming the PGSU from a PGS resin and a crosslinker during the formation of the microparticles. In some embodiments, the process is an emulsification-evaporation process. In other embodiments, the process is an extrusion-spheronization process. In yet other embodiments, the process is a phase separation-coacervation process. In other embodiments, the process is a spray process.

In some embodiments, the PGSU-based microparticles are characterized by an average particle size. As used herein, the term "average particle size" refers to the sum of particle lengths divided by the total number of particles in a sample, as measured by laser diffraction, in optical images, or in scanning electron microscopy (SEM) images.

In some embodiments, the PGSU-based microparticles are characterized by a span value. As used herein, the term "span value" refers to the quantity (D90–D10)/D50, where D10 is the particle length that 10% of the particles are at or under, D50 is the average particle size, and D90 is the particle length that 90% of the particles are at or under, as measured by laser diffraction, in optical images, or in SEM images.

Poly(glycerol sebacate) (PGS) is a cross-linkable elastomer formed as a co-polymer from glycerol and sebacic acid. PGS is biocompatible and biodegradable, reduces inflammation, improves healing, and has antimicrobial properties, all of which make it useful as a biomaterial in the biomedical field. PGS has limited processability options as a result of the constraints on advancing polycondensation reactions at high temperatures in the presence of an active pharmaceutical ingredient (API) or active biologic. PGS resin has limited solvent choices, since PGS resin is only soluble in organic solvents and not soluble in aqueous solvents, which restricts its ability to form emulsions that are compatible with APIs or active biologics. Further, PGS and PGSU that have been fully crosslinked into thermoset elastomers exhibit no solubility in any solvent, as well as no meltability, which further restrict processing options. Traditional emulsion processes for polymer microsphere formation rely on solubilizing the polymer and then evaporating the solvent and solidifying the microsphere. Curative polymer chemistries that require crosslinking are difficult to process in this manner. Further, the presence of the crosslinker alongside the API in the same formulation phase may be undesirable, since this may lead to unintended side reactions between the API, the crosslinker, and/or the polymer.

Bioresorbable elastomeric urethanes have been developed as a source of engineering material that provides both an elastomeric engineering compliance property to mimic the viscoelastic properties of tissue and a biodegradability property that may be tuned to degrade or deliver in a controlled surface-eroding mechanism, unlike the plastic and rigid lactides and glycolides that bulk degrade and lack sufficient viscoelasticity. Such a surface erosion mechanism makes the polyester polyol, PGS, and its urethane derivative, PGSU, excellent candidates for controlled drug release. The mechanisms of biodegradation for PGS and PGSU include hydrolysis, enzymatic degradation, and oxidative degradation.

PGSU is minimally swelling and demonstrates water impermeability over some time. PGSU does not experience as steep of a concentration gradient of API between the internal polymer and external environment compared to swellable polymers. Accordingly, PGSU offers a more dose-independent API release, where higher drug loading less dramatically impacts the rate of release.

PGSU also has elastomeric mechanical properties, including a low flexural modulus, a low compressive modulus, and a low tensile modulus, that make it a useful biomaterial in the form of microparticles, whether in an unloaded or API-loaded state.

In exemplary embodiments, the PGS resin used to produce the PGSU-based microparticles described herein is formed by a water-mediated synthesis process such as disclosed in U.S. Pat. No. 9,359,472, which is incorporated by reference herein.

Appropriate PGS resin compositions for forming PGSU-based microparticles may include any oligomer or polymer made from glycerol and sebacic acid. PGS resin compositions may include different stoichiometric ratios of glycerol and sebacic acid, different molecular weights, different polydispersities, different degrees of branching, different hydroxyl numbers, and different acid numbers. Beyond standard PGS resin, PGS resin with a low polydispersity index (PDI) and high molecular weight (MW) may also be used to formulate PGSU-based microparticles. Similarly, high PDI and high MW PGS resin may also be used.

In some embodiments, the PGS resin includes a molecular weight above 10,000 Da, alternatively above 15,000 Da, alternatively above 25,000 Da, or any value therebetween. In some embodiments, the PGS resin includes a polydispersity index less than 16, alternatively less than 14, alternatively less than 12, alternatively less than 10, alternatively less than 8, or any value, range, or sub-range therebetween. In some embodiments, the PGS resin includes an acid number between 20 and 80, alternatively between 30 and 70, alternatively between 40 and 60, alternatively between 35 and 55, alternatively between 40 and 50, or any value, range, or sub-range therebetween. In some embodiments, the PGS resin includes a hydroxyl number between 160 and 240, alternatively between 180 and 220, alternatively between 190 and 210, or any value, range, or sub-range therebetween. As used herein, a "hydroxyl number" value is as determined by American Society for Testing and Materials (ASTM) E222. In some embodiments, the PGS resin includes a stoichiometric ratio of glycerol-to-sebacic acid between 1:0.25 and 1:2, alternatively between 1:0.5 and 1:1.5, alternatively between 1:0.75 and 1:1.25, or any value, range, or sub-range therebetween.

In exemplary embodiments, the PGS resin is exposed to a crosslinker to convert the PGS resin to PGSU. In exemplary embodiments, the crosslinker is an isocyanate crosslinker. Appropriate isocyanate crosslinkers may be aliphatic or aromatic in structure and may include, but are not limited to, hexamethylene diisocyanate (HDI), methylene diphenyl diisocyanate (MDI), toluene diisocyanate (TDI), isophorone diisocyanate (IPDI), methylenebis(cyclohexyl isocyanate) (HMDI), tetramethylxylene diisocyanate (TMXDI), aliphatic isocyanates, aromatic isocyanates, aliphatic-aromatic combination isocyanates, and/or blocked isocyanates.

Appropriate NCO:OH stoichiometric ratios for the PGSU-based microparticles may be between 3:10 and 4:1, alternatively between 4:1 and 1:5, alternatively between 4:1 and 1:2, alternatively between 4:1 and 2:3, alternatively between 4:1 and 4:5, alternatively between 1:2 and 1:5, alternatively between 1:0.5 and 1:1.5, or any value, range, or sub-range therebetween. Conversion of a PGS:HDI weight ratio to an NCO:OH stoichiometric ratio depends on the hydroxyl number of the PGS. For a PGS resin with a hydroxyl number between 160 and 240, a PGS:HDI weight ratio of 3.5:1 results in an NCO:OH stoichiometric ratio between 1:0.84 and 1:1.26. For a PGS resin with a hydroxyl number between 160 and 240, a PGS:HDI weight ratio of 2:1 results in an NCO:OH stoichiometric ratio between 1:0.48 and 1:0.72.

In some embodiments, the crosslinker is present only in the first composition prior to the dispersing or combining. In other embodiments, the crosslinker is present only in the continuous fluid phase or second composition prior to the dispersing or combining. In yet other embodiments, the crosslinker is present in both the first composition and the continuous fluid phase or second composition prior to the dispersing or combining.

In some embodiments, the dispersing or combining occurs in the presence of a catalyst. Appropriate catalysts may include, but are not limited to, a heavy metal, such as, for example, tin or platinum, or an acid, such as, for example, citric acid or tartaric acid, or their salt forms, or enzymes, such as, for example, a lipase or an esterase.

In some embodiments, the catalyst is present only in the first composition prior to the dispersing or combining. In other embodiments, the catalyst is present only in the continuous fluid phase or second composition prior to the dispersing or combining. In yet other embodiments, the catalyst is present in both the first composition and the continuous fluid phase or second composition prior to the dispersing or combining.

In embodiments where the crosslinker and the catalyst are in the continuous fluid phase or second composition, the crosslinker and catalyst are able to partition into or diffuse into the first composition, allowing the PGS to crosslink into PGSU. In such embodiments, the PGS is able to effectively convert to PGSU, even though the required crosslinker and catalyst are not physically co-located alongside the PGS in the same composition at the start of the process.

Appropriate shapes for the produced PGSU-based microparticles may include, but are not limited to, spheres, ovals, rods, or spheroids. In some embodiments, the PGSU-based microparticles have a high aspect ratio, are needle-like, are flake-like, and/or are particle-like. The PGSU-based microparticles may be solid, hollow, or porous.

In some embodiments, the PGSU-based microparticles are produced on a small scale in a reactor having a volume of 0.5 L or less. In other embodiments, the PGSU-based microparticles are produced on an intermediate scale in a reactor having a volume of greater than 0.5 L up to 100 L. In other embodiments, the PGSU-based microparticles are produced on a large scale in a reactor having a volume of greater than 100 L. In some embodiments, the scale of the production is selected to achieve a predetermined average particle size and/or a predetermined particle size uniformity. Although scale-up of microparticle production is traditionally challenging in terms of low yield and particle size issues, increasing the scale of certain processes disclosed herein from a small scale to an intermediate scale decreases the average particle size and increases the particle size uniformity with good yield.

In some embodiments, the PGSU-based microparticles have an average particle size, as measured by laser diffraction or in optical images or SEM images, in the range of 1 μm to 1000 alternatively 1 μm to 800 μm, alternatively 1 μm to 500 μm, alternatively 1 μm to 300 μm, alternatively 1 μm to 200 μm, alternatively 1 μm to 100 μm, alternatively 1 μm to 50 μm, alternatively 1 μm to 10 μm, alternatively 30 μm to 50 μm, or any value, range, or sub-range therebetween. In other embodiments, the PGS particles have an average diameter of less than 1 μm or greater than 1000 μm.

In some embodiments, the PGSU-based microparticles include an active pharmaceutical ingredient (API). In some embodiments, the API is in an amorphous state in the PGSU-based microparticle. In some embodiments, the API is in an amorphous solid dispersion in the PGSU-based microparticle. In some embodiments, the API is solubilized in the PGSU-based microparticle. In some embodiments, the API is in a crystalline state in the PGSU-based microparticle. In some embodiments, the API is in a semi-crystalline state in the PGSU-based microparticle due to partial miscibility of the API in PGSU. In some embodiments, the API is in a powder state in the PGSU-based microparticle. In some embodiments, the API is micronized. In some embodiments, the API is conjugated to the PGSU. In some embodiments, the API is dispersed in the PGSU.

Appropriate APIs may include, but are not limited to, analgesics, anti-inflammatory, antibiotics, antidepressants, anticoagulant, antiepileptic, antipsychotics, anticancer, antivirals, sedatives, stimulants, peptides, proteins, antibodies, antigens, growth factors, small interfering ribonucleic acid (siRNA), messenger ribonucleic acid (mRNA), small molecules, large molecules, nutrient supplements, and vitamins.

Appropriate dispersed API particle sizes may be about 100 μm or less, alternatively about 50 μm or less, alternatively about 20 μm or less, alternatively about 10 μm or less, or any value, range, or sub-range therebetween. Conventional microparticle emulsion processes require the API to be in a dissolved state for the emulsification. This typically leaves the API in an amorphous state upon solvent removal. An API in an amorphous state tends to release faster than in a crystalline state, with greater burst release, and with an increased probability of instability, uncontrolled recrystallization, and mobility within the polymer matrix. An API in an amorphous state is also more likely to cross-react with reactive chemistries. In exemplary embodiments, a process of forming PGSU-based microparticles incorporates an API in a crystalline or powder form. The API being in crystalline or powder form in the PGSU-based microparticles slows the release of the API from the microparticles, especially for water-soluble APIs. API in a crystalline or powder form also prevents unwanted chemical cross-reaction with chemical crosslinkers such as PGSU urethane crosslinkers. Keeping the API in a crystalline or powder form is also a simpler and more direct process that does not modify the API with additional steps.

Appropriate loadings of the API in the microparticles may include, but are not limited to, about 1 to about 50 wt %, alternatively about 5 to about 40 wt %, alternatively about 10 to about 30 wt %, alternatively about 15 to about 25 wt %, alternatively about 10 to about 20 wt %, alternatively about 20 to about 30 wt %, or any value, range, or sub-range therebetween.

After formation, the PGSU-based microparticles may be cured to complete crosslinking and remove residual solvent. Appropriate curing temperatures may include, but are not limited to, about 20° C. to about 100° C., alternatively about 20° C., alternatively about 20° C. to about 40° C., alternatively about 40° C., alternatively about 40° C. to about 80° C., alternatively about 80° C., alternatively about 80° C. to about 100° C., or any value, range, or sub-range therebetween.

Appropriate curing times for PGSU-based microparticles may include, but are not limited to, about 1 to about 168 hours, alternatively about 1 to about 24 hours, alternatively about 1 hour to about 4 hours, alternatively about 4 hours to about 24 hours, alternatively about 24 to about 168 hours, alternatively about 1 hour, alternatively about 4 hours, alternatively about 24 hours, alternatively about 168 hours, or any value, range, or sub-range therebetween.

PGSU microparticles made by emulsification-solvent removal or extrusion-spheronization may use mineral oil as the continuous phase or spheronization bath. In exemplary embodiments, PGSU-based microparticles may be washed with a solvent that is miscible with mineral oil but does not swell the PGSU and does not dissolve the loaded API. Solvents used to wash the mineral oil from the microspheres may include, but are not limited to, heptane, hexane, ethyl acetate, or propyl acetate. Heptane is a preferred solvent for the washing step, as it is a United States Pharmacopeia—National Formulary (USP-NF) Class 3 residual solvent, miscible with mineral oil, and does not swell PGSU.

In exemplary embodiments, the microparticles are allowed to settle or are centrifuged to remove the supernatant mineral oil. A solvent miscible with the mineral oil, such as, for example, heptane, hexane, ethyl acetate, or propyl acetate is added, and the microparticles are vortexed to wash and dissolve any mineral oil. The microparticles are allowed to sediment or are centrifuged to remove the supernatant solvent. This process of washing may be repeated, such as, for example, 3-5 times, until the amount of mineral oil is below a predetermined value. The microparticles may be dried at 40° C. at 10 Torr for 3 days.

In exemplary embodiments, the PGSU-based microparticles contain less than 0.5 wt % residual solvent in case of USP-NF Class 3 solvents such as acetone, heptane, ethyl acetate, or propyl acetate. In exemplary embodiments, the PGSU-based microparticles contain less than 0.029 wt % residual solvent in case of USP-NF Class 2 solvent such as hexane.

In exemplary embodiments, the PGSU-based microparticles contain less than 10 parts-per-million (ppm), such as, for example, less than 4 ppm or less than 1 ppm, of residual unreacted isocyanate.

Emulsification-Solvent Evaporation Process

In some embodiments, PGSU-based microparticles are formed by an emulsification-solvent evaporation process. In some embodiments, the emulsification-solvent evaporation process includes forming a continuous phase including a continuous phase solvent, forming a dispersed phase including PGS resin, dispersing the dispersed phase in the continuous phase to form microparticles as the PGS resin reacts with a crosslinker, and removing solvent.

In exemplary embodiments, the dispersed phase includes PGS resin and a dispersed phase solvent. An appropriate concentration of the PGS resin in the dispersed phase is in the range of 0.1 to 99% w/w, alternatively 1 to 99% w/w, alternatively 5 to 99% w/w, alternatively 2 to 70% w/w, alternatively 20 to 55 wt %, alternatively 25 to 50 wt %, alternatively 50 to 70% w/w, or any value, range, or sub-range therebetween. In exemplary embodiments, the obtained crosslinking density increases with an increasing concentration of PGS resin in the dispersed phase. The crosslinking density is an important parameter in controlling the release kinetics and degradation time of the PGSU-based microparticles. The mesh size of the crosslinked PGSU network is also impacted by the concentration of PGS resin in the dispersed phase, which affects the permeability and transport through the PGSU matrix, in addition to the release kinetics and the degradation rate.

The crosslinker may be provided only in the dispersed phase, only in the continuous phase, or in both the dispersed phase and the continuous phase prior to the dispersing. In embodiments where the crosslinker is present in the continuous phase, the hydroxyl groups of the PGS resin in the emulsion droplets react with the crosslinker as it partitions from the continuous phase to the dispersed phase after addition of droplets of the dispersed phase to the continuous phase, thereby forming PGSU in the dispersed phase droplets. This helps the PGS droplet crosslink from the outside inwards and prevents the coalescence of emulsion droplets, thereby forming stable solid microparticles.

Appropriate dispersed phase solvents may include, but are not limited to, acetone, acetonitrile, ethyl acetate, propyl acetate, dichloromethane, chloroform, methanol, ethanol, propanol, butanol, dimethyl sulfoxide, dimethyl formamide, or tetrahydrofuran. In exemplary embodiments, the dispersed phase solvent is acetone.

Appropriate continuous phase solvents may include, but are not limited to, mineral oil, paraffin oil, silicone oil, vegetable oils, seed oils, waxes, lipophilic liquids, lipophilic polymers, water, heptane, hexane, or cyclohexane. In exemplary embodiments, the continuous phase solvent is mineral oil.

The continuous phase may also include one or more stabilizers. In some embodiments, the stabilizer is a surfactant. Appropriate stabilizers may include, but are not limited to, anionic surfactants, cationic surfactants, amphoteric surfactants, nonionic surfactants, polyvinyl alcohol, polymeric surfactants, poloxamers, ethoxylates, fatty acid esters, polyhydroxy compounds, colloidal silicas, or fumed silicas. In some embodiments, both the dispersed and continuous phases contain at least one stabilizer. In some embodiments, the stabilizer is 2-5 wt % sorbitan trioleate (Span® 85, Sigma-Aldrich, St. Louis, MO) in an acetone/mineral oil system.

In some embodiments, certain chains of the PGS resin act as a stabilizer for the emulsion depending on the molecular weight, polydispersity, chain length, branching, and/or glycerol-to-sebacic acid ratio of the PGS resin. In exemplary embodiments, a portion of the PGS resin with higher polydispersity acts as a stabilizer for the emulsion and promotes formation of spherical PGSU-based microparticles without aggregation. Appropriate polydispersity for a PGS resin of weight average molecular weight (Mw) greater than about 13,000 Da is in the range of 5-20, alternatively 8-15, or any value, range, or sub-range therebetween. For PGS resin with a Mw of 25,000 Da, a polydispersity lower than 5 has been observed to lead to aggregation of microparticles, for example. In exemplary embodiments, the Mw of the PGS resin is in the range of about 10,000 to about 20,000 Da, alternatively about 13,500 to about 18,000 Da, alternatively about 15,000 to about 16,000 Da, or any value, range, or sub-range therebetween with a polydispersity in the range of about 6 to about 13, alternatively about 6.5 to about 12, alternatively about 8 to about 9, or any value, range, or sub-range therebetween.

In some embodiments, the emulsification-solvent evaporation process includes a catalyst. The catalyst may be provided only in the dispersed phase, only in the continuous phase, or in both the dispersed phase and the continuous phase prior to the dispersing. The catalyst may be used during the crosslinking process, catalyzing the reaction between the isocyanate or other crosslinker and the hydroxyl of the PGS resin. Other appropriate crosslinkers may include, but are not limited to, citric acid, salicylic acid, itaconic acid, diglycidyl ethers, divinyl sulfones, carbodiimides, acrylates, methacrylates, acrylamides, epoxies, biotin, avidin, or streptavidin. The catalyst may also be used to accelerate the PGS polycondensation reaction, during the synthesis of the PGS resin or during formation of a PGS thermoset. The catalyst may remain in the final cured PGSU-based microparticles; hence catalyst concentrations are preferably selected to fall within acceptable limits for safety in vivo.

In other embodiments, no catalyst is used in the emulsification-solvent evaporation process to form the PGSU-based microparticles. The PGSU-based microparticles may be softer and more elastomeric and may also degrade faster in embodiments where no catalyst is used in comparison to embodiments including a catalyst.

In some embodiments, an API is dissolved or suspended in the dispersed phase. In such embodiments, the PGSU-based microparticles formed by the emulsification-solvent evaporation process contain the API.

In some embodiments, concentrations and solvents are selected to achieve predetermined phase viscosities or a predetermine phase viscosity ratio. In exemplary embodiments, the dispersed phase includes PGS resin in a concentration in the range of about 20 wt % to about 60 wt %, alternatively about 30 wt % to about 60 wt %, alternatively about 40 wt % to about 60 wt %, alternatively about 45 wt % to about 55 wt %, or any value, range, or sub-range therebetween. In exemplary embodiments, the viscosity of the continuous phase solvent is in the range of about 30-40 cP at 20° C. or in the range of about 13-20 cP at 40° C. In exemplary embodiments, the ratio of the viscosity of the dispersed phase to the viscosity of the continuous phase is in the range of about 10:1 to about 50:1, alternatively about 10:1 to about 30:1, alternatively about 10:1 to about 20:1, alternatively about 15:1 to about 25:1, alternatively about 20:1 to 30:1, or any value, range, or sub-range therebetween.

In exemplary embodiments, the weight ratio of the dispersed phase to the continuous phase is in the range of about 1:10 to about 1:30, alternatively about 1:10 to about 1:20, alternatively about 1:10, alternatively about 1:15, alternatively about 1:20, alternatively about 1:30, or any value, range, or sub-range therebetween.

In some embodiments, the viscosity ratio and the weight ratio are selected to provide PGSU-based microparticles having an average particle size in the range of about 20 μm to about 200 μm, alternatively about 25 μm to about 100 μm, alternatively about 40 μm to about 80 μm, or any value, range, or sub-range therebetween and having a span value of less than 4, alternatively less than 3, alternatively less than 2, or any value, range, or sub-range therebetween.

In exemplary embodiments, the emulsification occurs at or around room temperature. Emulsification at room temperature allows the droplets to break down to smaller sizes before the crosslinking takes place. After about 20-30 minutes of emulsification, significant further reduction in microparticle size was not observed. The temperature of the emulsion may therefore be raised about 20 minutes after emulsification to increase the crosslinking rate and dispersed solvent evaporation rate.

After emulsification, the emulsion may be heated up to a temperature in the range of about 40° C. to about 120° C., alternatively about 40° C., alternatively about 70° C., alternatively about 100° C., alternatively about 120° C., or any value, range, or sub-range therebetween. Heating causes the evaporation of the dispersed phase solvent, as well as driving the crosslinking reaction. Hence, the temperature of processing affects the crosslinking density, the average size of the PGSU-based microparticles, the size distribution of the PGSU-based microparticles, the surface charge of the PGSU-based microparticles, the encapsulation efficiency of an API, and the release kinetics of the API from the PGSU-based microparticles.

In some embodiments, the emulsion is heated to a particular temperature for about 8 hours to about 168 hours, alternatively about 8 hours, alternatively about 24 hours, alternatively about 96 hours, alternatively about 168 hours, or any value, range, or sub-range therebetween. Heating at a particular temperature for a period of time allows the isocyanate or other crosslinker to react completely with the PGS resin. Thus, heating for longer periods of time increases the crosslinking density. In exemplary embodiments, higher temperatures give higher crosslinking densities. Heating at a particular temperature for longer periods of time also gives higher crosslinking densities. However, higher temperatures have been found to be more effective than longer periods of time in increasing the crosslinking density.

In some embodiments, PGSU-based microparticles are made by a single emulsification followed by solvent removal. Appropriate single emulsion dispersed phase/continuous phase combinations may include, but are not limited to, organic solvent/water, organic solvent/oil, or first organic solvent/second organic solvent. Solvent removal may be achieved by evaporation, extraction, or solvent displacement. In exemplary embodiments, the single emulsion is an organic solvent/oil emulsion.

In some embodiments, PGSU-based microparticles are made by double emulsification followed by solvent removal. Appropriate double emulsion first dispersed phase/second dispersed phase/continuous phase combinations may include water/organic solvent/oil, water/organic solvent/water, first organic solvent/second organic solvent/water, first organic solvent/second organic solvent/third organic solvent, or first organic solvent/second organic solvent/oil.

In the case of double emulsions, an API may be dissolved or dispersed in a solvent which gets emulsified in the PGS resin solution in an organic solvent to form a primary emulsion. This primary emulsion may be emulsified in the continuous phase to form a secondary emulsion. The solvent may be removed by extraction, evaporation, or displacement.

Emulsification may be achieved by any of a number of different emulsification techniques, including, but not limited to, mechanical stirring, homogenization, ultra-homogenization, mixing, magnetic stirring, sonication, ultra-sonication, colloidal milling, membrane emulsification, or a microfluidic technique.

Unexpectedly, large amounts of emulsification energy are not necessarily better at forming smaller microparticles. For example, high mixing speeds cause entrapment of air in the continuous phase in some cases, leading to aggregation of microparticles. This may be due to the instability introduced by the air/dispersed phase and air/continuous phase interfaces. This may also be related to the hydrophobic and/or lipophilic nature of the PGSU-based microparticles. This may also be related to the negative charge and surface energy of the PGSU-based microparticles.

In some embodiments, the emulsification is done using an overhead stirrer, such as, for example, a dissolver stirrer. For a continuous phase of 300 g, such as, for example, mineral oil (30-40 cP at 40° C.) with 5% Span 85, an appropriate stirrer speed is about 1500 rpm or less, alternatively about 1500 rpm to about 600 rpm, alternatively about 1000 rpm or less, alternatively about 800 rpm or less, alternatively about 600 rpm or any value, range, or sub-range therebetween for addition and dissolving of crosslinker (HDI) and tin catalyst in the mineral oil and also for formation of an emulsion between a dispersed phase and a continuous oil phase. An appropriate concentration of PGS in the dispersed phase is about 50 wt % in the dispersed phase solvent. The dispersed phase may be added dropwise to the continuous phase at the rate of about 3-7 mL/min at room temperature until a dispersed phase-to-continuous phase weight ratio of 1:20 is reached.

In some embodiments, the dispersed phase solvent is a higher boiling point solvent having a boiling point of 65° C. or higher, such as, for example, acetonitrile. An appropriate concentration of PGS resin in a higher boiling point solvent is in the range of 30-70 wt %, alternatively 30-50 wt %, alternatively 40-60 wt %, alternatively 50-70 wt %, or any value, range, or sub-range therebetween. In exemplary embodiments, the emulsification-solvent evaporation technique includes isocyanate crosslinker and tin catalyst in the dispersed phase. The emulsification of a dispersed phase with higher boiling point solvent may be performed at a temperature in the range of room temperature to about 40° C. In exemplary embodiments, the continuous phase temperature to manufacture PGSU-based microparticles in acetonitrile/mineral oil emulsion is about 40° C.

In some embodiments, the emulsification technique is ultra-homogenization. Ultra-homogenization may be performed using an Ultra-Turrax® dispersing device (IKA Group, Staufen, Germany). An appropriate speed for ultra-homogenization is in the range of 5,000-25,000 rpm, alternatively 10,000-25,000 rpm, alternatively 15,000-25,000 rpm, or any value, range, or sub-range therebetween. The ultra-homogenization may be carried out at room temperature, as it generates heat due to the amount of energy applied. The ultra-homogenization may be carried out for up to 20 minutes, up to 10 minutes, or up to 5 minutes until an emulsion is formed, after which the emulsion is mixed using a mechanical stirrer, such as, for example, an overhead stirrer or a magnetic stirrer, as PGSU droplets cure. An appropriate concentration of PGS resin in a dispersed phase solvent, such as, for example, acetone, for ultra-homogenization is in the range of 5-70 wt %, alternatively 5-20 wt %. In some embodiments, decreasing the concentration of PGS in the dispersed phase solvent decreases the particle size distribution and aggregation of the PGSU-based microparticles.

In some embodiments, the emulsification-solvent evaporation process is a membrane emulsification-solvent evaporation process, where the emulsification technique is membrane emulsification. In such embodiments, the dispersed phase flows through a membrane, preferably of stainless steel, having a predetermined pore size. The stainless steel membrane may be hydrophilic or hydrophobic. An appropriate predetermined pore size may be, but is not limited to, in the range of about 1 μm or greater, about 20 μm or less, about 2 μm to about 15 μm, about 2 μm to about 4 μm, about 3 μm, about 5 μm to about 15 μm, about 10 μm, about 10 μm to about 20 μm, or any value, range, or subrange therebetween. An appropriate flow rate of the dispersed phase through the membrane may be, but is not limited to, in the range of 0.1-1 mL/min for a membrane surface area of about 12.6 $cm^2$. The difference in viscosities between the dispersed and continuous phases affects the resulting particle size of the PGSU-based microparticles made by membrane emulsification. An appropriate ratio of the dispersed phase viscosity to the continuous phase viscosity is about 10:1 or greater, alternatively about 15:1 or greater, alternative about 20:1 or greater, or any value, range, or sub-range therebetween.

In some embodiments, microparticles are manufactured by an emulsification-polymerization-solvent evaporation process. Glycerol and sebacic acid are dissolved in a suitable solvent, such as, for example, acetone, propyl acetate, or dichloromethane, and emulsified in water or oil to form as emulsion. The emulsion droplet may or may not contain an API. A crosslinker may or may not be added to the dispersed or continuous phase to bring about the crosslinking of the polymerizing PGS. Polymerization in the emulsion droplet results in PGS-based or PGSU-based microparticles.

In some embodiments, microparticles are manufactured by an emulsification-solvent evaporation process scaled up to a reactor. The reactor may have a capacity of 0.5 L to 100 L, or alternatively 0.5 L to 50 L, or 0.5 L to 10 L, or alternatively 0.5 L to 2 L, or any value, range, or subrange therebetween. An overhead stirrer may be used to bring about homogenization and particle size reduction. Appropriate overhead stirrers may include, but are not limited to, radial flow propellers or impellers, axial flow propellers or impellers, dissolver stirrers, angled blade stirrers, or ultra-homogenizers. The speed of mixing may be over 100 rpm, alternatively over 500 rpm, or alternatively over 1000 rpm based on the desired particle size. A jacketed reactor may be used to better control the temperature of emulsification and solvent evaporation. A $N_2$ jacket may be applied to the surface of the reaction components to prevent contact with atmospheric moisture.

In exemplary embodiments, scaling up the emulsification-solvent evaporation process gives lower average particle size and span value. This may be due to more efficient mixing, better temperature control, better control on addition of the dispersed phase, the $N_2$ jacket in the reactor preventing the effect of moisture on isocyanate crosslinking, or a combination of these factors.

Extrusion-Spheronization Process

In some embodiments, PGSU-based microparticles are made by an extrusion-spheronization process. The extrusion-spheronization process includes extruding from an extruder 10 a composition including PGS resin to form an extrudate 20 and dispersing the extrudate 20 in a continuous fluid phase 30 of a spheronization bath 40 to form PGSU-based microparticles 50, as shown schematically in FIG. 1. The crosslinker may be present only in the extrudate 20, only in the continuous fluid phase 30 of the spheronization bath 40, or in both the extrudate 20 and the continuous fluid phase 30 of the spheronization bath 40 prior to the dispersing. The PGS resin composition may be solvated or substantially solvent-free.

In some embodiments, the extruding is a reactive injection extruding. In some embodiments, the extruding includes coextruding the PGS resin starting material, either solvated or substantially solvent-free, in an extrudate with a crosslinker, such as, for example, isocyanate. In exemplary embodiments, the extruding includes forming an extrudate of PGS resin, crosslinker, and catalyst, with the crosslinker and catalyst separated into the two barrels of a dual-barrel syringe prior to the extruding. The two components may be flowed through a mixing tip, which may be static or dynamic, and the mixed extrudate is introduced into a continuous phase. In some embodiments, the crosslinker and catalyst being split between the extrudate and spheronization bath drives the reaction between the crosslinker and PGS resin both inside-out and outside-in of the extrudate pellets formed, which stabilizes the formed spheronized pellets of PGSU. In some embodiments, the extrudate contains PGS resin and crosslinker and the spheronization bath contains catalyst and crosslinker. When an API is included, the API may be split into the two barrels of the syringe on the crosslinker and catalyst sides. Other arrangements besides a dual-barrel syringe may provide the two separated compartments initially until a specific moment where the two components meet and mix. The two components may meet and mix prior to being introduced into the continuous phase, at the same time as being introduced into the continuous phase, or after being introduced into the continuous phase.

In some embodiments, the PGS resin, crosslinker, and catalyst are pre-combined into a single-barrel syringe or other similar single compartment. In such embodiments, the working time or pot life of the blend may be extended to prevent premature crosslinking inside the single compartment, such as, for example, by reducing or eliminating the catalyst, by reducing applied heat, and/or diluting the PGS solution in greater amounts of solvent.

In some embodiments, the dispersing includes adding the extrudate at a rate of about 5-10 mL/min to a 300-g spheronization bath. In some embodiments, the extrudate is dispersed into a spheronization bath by an air cylinder at a pressure in the range of about 3-20 psi. In other embodiments, the extrudate is fed into a spheronization bath using single screw extrusion, twin screw extrusion, peristaltic pump dispensing, piston pump dispensing, syringe pump dispensing, or other method of conveying material. The dispersed phase may initially be extruded into air followed by introduction into the spheronization bath, or the dispersed phase may alternatively be extruded directly into the spheronization bath.

In some embodiments, the extrusion of the dispersed phase follows a fiber extrusion process. In such embodiments, the extrusion may occur through a spinneret with a single or multiple exit ports that form one or many extruded filaments. The extruded filaments may be circular in cross-section or have another multi-lobal or geometric shape. The dispersed phase may initially be extruded through the spinneret into air followed by introduction into the spheronization bath, or the dispersed phase may alternatively be extruded through the spinneret directly into the spheronization bath.

The spheronization may be carried out in a spheronization bath containing a continuous fluid phase or in a spheronizer, such as, for example, a Marumerizer™ spheronizer (LCI Corporation, Charlotte, NC).

In some embodiments, the extrudate is pelletized or micropelletized to obtain pellets of a predetermined size, and the pellets are then spheronized. In some embodiments, the dispersed phase extrudate is broken up into smaller segments upon introduction to the continuous phase, and the smaller segments are then spheronized. Appropriate methods or devices to disturb and break up the extrudate may include, but are not limited to, mechanical stirring, homogenization, ultra-homogenization, mixing, magnetic stirring, sonication, ultra-sonication, colloidal milling, membrane emulsification, a microfluidic technique, mechanical cutting, rotary die face cutting, offset rotary die face cutting, guillotine cutting, mechanical chopping, a spinning blade, a sweeping blade, an air knife, a vibrating blade, or a vibrating microtome. Segmentation of the extrudate may occur while the extrudate is immersed in liquid or in the continuous phase, such as, for example, with an underwater or submerged pelletizer or pelletizing extruder, or segmentation of the extrudate may alternatively occur in air. Segmentation of the extrudate may occur while the extrudate is not yet fully cured, segmentation of the extrudate may alternatively occur after the extrudate is cured.

In preferred embodiments, the spheronization bath contains the continuous fluid phase. In preferred embodiments, the continuous fluid phase includes an oil. Appropriate oils for a continuous fluid phase may include, but are not limited to, mineral oil, paraffin oil, silicone oil, vegetable oils, seed oils, or waxes. In other embodiments, the continuous fluid phase is an aqueous liquid, such as, for example, water. In other embodiments, the continuous fluid phase is a hydrocarbon. Appropriate hydrocarbons for the continuous fluid phase may include, but are not limited to, heptane, hexane, or cyclohexane. In some embodiments, the continuous fluid phase is mineral oil having a viscosity of 100-120 cP at 20° C., 30-50 cP at 40° C., 10-15 cP at 70° C., or 2-10 cP at 100° C. In some embodiments, the continuous fluid phase is mineral oil having a viscosity of 2-10 cP at 100° C. or 10-20 cP at 70° C. with 3-5% Span 85.

In some embodiments, the continuous fluid phase is heated to a temperature in the range of about 40° C. to about 100° C., alternatively about 40° C., alternatively about 70° C., alternatively about 100° C., or any value, range, or sub-range therebetween.

The continuous phase may also contain crosslinkers, catalysts, stabilizers, emulsifiers, surfactants, glidants, viscosity builders, processing aids, or other additives. In some embodiments, the spheronization bath contains one or more stabilizers. Appropriate stabilizers may include, but are not limited to, anionic surfactants, cationic surfactants, amphoteric surfactants, nonionic surfactants, polyvinyl alcohol, polymeric surfactants, poloxamers, ethoxylates, fatty acid esters or polyhydroxy compounds, colloidal or fumed silicas, or a combination thereof. Certain PGS resin polymer or oligomer chains from the extrudate may also act as stabilizers during the spheronization process. In some embodiments, the stabilizer is 3-5% Span 85.

In some embodiments, the spheronization bath is stirred with a magnetic stir bar, propeller, impeller, or overhead stirrer. Appropriate speeds of stirring include, but are not limited to, up to about 1000 rpm, alternatively at about 500-800 rpm, alternatively up to about 700 rpm, or any value range, or sub-range therebetween. In other embodiments, the spheronization bath is ultra-homogenized or sonicated. Other energy-imparting methods of breaking up the extrudate into smaller segments for spheronization include, but are not limited to, a spinning blade, oscillating blade, vibrating grate, or similar. In other embodiments, a static grate, mesh, or membrane is used to passively break apart the extrudate by mechanically disrupting and constricting flow.

To create and cure PGSU or other crosslinkable polymer, a crosslinker is typically present. The crosslinker may be present only in the extrudate, only in the spheronization bath, or in both the extrudate and the spheronization bath.

The PGSU-based microparticles may be made by extrusion-spheronization with the crosslinker initially split between the extrudate and the spheronization bath, with a proportion of crosslinker in the extrudate dispersed phase and a proportion of crosslinker in the spheronization bath continuous phase. The weight ratio of crosslinker in the dispersed phase to crosslinker in the continuous phase may be in the range of about 4:1 to about 1:4, alternatively at a ratio of about 2:1 to about 1:2, alternatively at a ratio of about 1:1, alternatively at a ratio of about 4:1, alternatively at a ratio of about 2:1, alternatively at a ratio of about 1:2, alternatively at a ratio of about 1:4, or any value, range, or subrange therebetween.

In some embodiments, the crosslinker is entirely in the continuous phase. PGSU-based microparticles are able to cure with the crosslinker being initially entirely in the continuous phase. Without wishing to be bound by theory, the curing may occur through diffusive crosslinking, assisted by heat, or with a gradient of urethane crosslinks from the outside inward spatially within the microparticle.

In some embodiments, a catalyst is present. The catalyst may be present only in the extrudate, only in the spheronization bath, or in both the extrudate and the spheronization bath.

The PGSU-based microparticles may be made by extrusion-spheronization with the catalyst initially split between the extrudate and the spheronization bath, with a proportion of catalyst in the extrudate dispersed phase and a proportion of catalyst in the spheronization bath continuous phase. The weight ratio of catalyst in the dispersed phase to catalyst in the continuous phase may be in the range of about 4:1 to about 1:4, alternatively at a ratio of about 2:1 to about 1:2, alternatively at a ratio of about 1:1, alternatively at a ratio of about 4:1, alternatively at a ratio of about 2:1, alternatively at a ratio of about 1:2, alternatively at a ratio of about 1:4, or any value, range, or subrange therebetween.

In some embodiments, the catalyst is entirely in the continuous phase. PGSU-based microparticles are able cure with the catalyst being initially entirely in the continuous phase. Without wishing to be bound by theory, the curing may occur through diffusive crosslinking, assisted by heat, or with a gradient of urethane crosslinks from the outside inward spatially within the microparticle.

In preferred embodiments, the extrudate is substantially solvent-free. Correspondingly, the PGSU-based microparticles generated by the extrusion-spheronization process may also be substantially solvent-free such that no solvent evaporation is needed.

In some embodiments, the extrudate includes one or more APIs. The APIs may be in a dissolved state in the extrudate, in a dispersed state in the extrudate, or in a combination of dissolved and dispersed states in the extrudate. When in a dissolved state in the extrudate, the API is typically then in an amorphous state in the microparticles. When dispersed in a crystalline, semi-crystalline, or powder state in the extrudate, the API remains in the crystalline, semi-crystalline, or powder state in the microparticles.

When the continuous fluid phase is an oil, such as, for example, mineral oil, the PGSU-based microparticles may be cured in the spheronization bath at a temperature in the range of about 40° C. to about 100° C., alternatively about 40° C., alternatively about 70° C., alternative in the range of about 70° C. to about 100° C., alternatively up to about 100° C., alternatively about 100° C., or any value, range, or sub-range therebetween, for a time period of up to about 168 hours, alternatively about 4 hours to about 168 hours, alternatively about 4 hours, alternatively about 8 hours, alternatively about 24 hours, alternatively about 168 hours, or any value, range, or sub-range therebetween, to increase the crosslinking density. The higher temperature of the spheronization bath helps in driving the reaction.

Appropriate extrudate to spheronization bath weight ratios may include, but are not limited to, about 1:10 to about 1:30, alternatively about 1:10, alternatively about 1:15, alternatively about 1:20, alternatively about 1:30, or any value, range, or sub-range therebetween.

In exemplary embodiments, the PGSU-based microparticles made by an extrusion-spheronization process have smaller average sizes and higher crosslinking densities as compared to PGSU-based microparticles made by an emulsification-solvent evaporation process for the same temperatures, time of curing, PGS-to-isocyanate, and PGS-to-catalyst ratios. The PGSU microparticles made by an extrusion-spheronization process may also show less overall aggregation and coalescence as compared to those made by an emulsification-solvent evaporation process. Without wishing to be bound by theory, the increased aggregation and coalescence of an emulsification-solvent evaporation process may be due to the dispersed phase solvent, i.e. acetone, evaporation and partial miscibility of acetone in the mineral oil in case of emulsification-solvent evaporation process. The solvent-free aspect of an extrusion-spheronization process is advantageous as well in terms of residual solvent safety. A substantially solvent-free extrusion-spheronization process results in a higher viscosity dispersed phase, which may convey some advantages for spheronization. A substantially solvent-free extrusion-spheronization process also may eliminate or avoid any negative processing effects from solvents, such as introducing undesirable moisture, bubbles, pores, or impurities. Additionally, the solubility of the API is not a limiting factor for encapsulation of the API in a substantially solvent-free extrusion-spheronization process, making the process very robust.

In some embodiments, microparticles are manufactured by an extrusion-spheronization process scaled up to a reactor. The reactor may have a capacity of 0.5 L to 100 L, or alternatively 0.5 L to 50 L, or 0.5 L to 10 L, or alternatively 0.5 L to 2 L, or any value, range, or subrange therebetween. An overhead stirrer may be used to bring about homogenization and particle size reduction. Appropriate overhead stirrers may include, but are not limited to, radial flow propellers or impellers, axial flow propellers or impellers, dissolver stirrers, angled blade stirrers, or ultra-homogenizers. The speed of mixing may be over 100 rpm, alternatively over 500 rpm, or alternatively over 1000 rpm based on the desired particle size. A jacketed reactor may be used to better control the temperature during the process. Temperature may be set between room temperature to 120° C., or between room temperature and 100° C., or between room temperature and 80° C., or between room temperature and 60° C., or between room temperature and 40° C. A $N_2$ jacket may be applied to the surface of the reaction components to prevent contact with atmospheric moisture.

Phase Separation-Coacervation Process

In some embodiments, PGSU-based microparticles are made by a phase separation-coacervation process. The phase separation-coacervation process includes dissolving PGS resin in a solvent to form a solution and adding a non-solvent for the PGS resin to the solution. The non-solvent is miscible with the solvent but the PGS resin is insoluble in the non-solvent. The addition of the non-solvent decreases the solubility of the PGS resin in the solution and ultimately causes the PGS resin to phase separate or precipitate from the solvent/non-solvent solution and form microparticles.

Appropriate solvents for dissolving PGS resin may include, but are not limited to, acetone, acetonitrile, ethyl acetate, propyl acetate, dichloromethane, chloroform, methanol, ethanol, propanol, butanol, dimethyl sulfoxide, dimethyl formamide, or tetrahydrofuran.

Appropriate non-solvents for PGS resin may include, but are not limited to, benzene, pentane, hexane, heptane, isooctane, cyclohexane, isooctane, xylene, or water. In some embodiments, the phase separation is caused by adding a crosslinker to form crosslinked polymer, i.e., PGSU, which is insoluble in the solvent. The crosslinker may be dissolved only in the solution, only in the non-solvent, or in both the solution and the non-solvent prior to the dispersing.

In some embodiments, the PGSU-based microparticles include an API. The API may be dispersed or dissolved in the PGS resin solution. Coating of the PGS resin onto a core API may be achieved, for example, by adding a non-solvent, a salt, or an incompatible polymer to the PGS resin solution, changing the temperature of the PGS resin solution, or inducing a polymer-polymer interaction.

In some embodiments, the PGSU-based microparticles are formed from a PGS resin having a charged backbone. In such embodiments, the phase separation-coacervation may be achieved by the presence of multivalent ions, such as, for example, $Ca^{2+}$, $Cu^{2+}$, $Zn^{2+}$, or $Mn^{2+}$.

In some embodiments, another polymer is added that interacts with PGS resin to cause the phase separation-coacervation. Appropriate other polymers may include, but are not limited to polyelectrolytes, such as, for example, chitosan, alginate, or polyacrylic acid. In some embodiments, polyelectrolytes, such as, for example, deoxyribonucleic acid (DNA) or polyampholytes, such as, for example, proteins or peptides, may be added to cause phase separation-coacervation and simultaneous encapsulation.

In exemplary embodiments, the addition of the non-solvent and the presence of the crosslinker concurrently cause the phase separation. In some embodiments, the solvent is ethyl acetate, the non-solvent is heptane, the solution includes 5-10% PGS resin in ethyl acetate, and the crosslinker is dissolved in the ethyl acetate solution or the non-solvent. The catalyst may be dissolved in the non-solvent. In some embodiments, the non-solvent is added dropwise to the solution at room temperature while stirring. An appropriate temperature for the phase separation may include, but is not limited to, about room temperature to about 70° C., alternatively about room temperature, alternatively up to about 40° C., alternatively up to about 70° C., or any value, range, or sub-range therebetween. In exemplary embodiments, the dispersing occurs with stirring. The stirring may be performed, for example, with a magnetic stir bar or an overhead stirrer at a speed, for example, of about 100-1000 rpm, alternatively about 300-1000 rpm, alternatively about 500-1000 rpm, or any value, range, or sub-range therebetween. An appropriate volume ratio of solvent to non-solvent at room temperature may include, but is not limited to, about 6:1 to about 9:1, alternatively about 6:1, alternatively about 7:1, alternatively about 8:1, alternatively about 9:1, or any value, range, or sub-range therebetween. Addition of the non-solvent brings about the phase separation of PGS polymer chains, causing them to fold and collapse. The crosslinker causes the collapsed PGS polymer chains to crosslink, thereby forming a microparticle. The average size of the resulting PGSU-based microparticles increases with increasing initial concentration of the PGS resin, since at higher concentration the PGS polymer chains are more likely to collapse onto each other or "micro-precipitate". The solvent-non-solvent ratio may also affect the average particle size of the PGSU-based microparticles. The formed PGSU-based microparticles may be collected by any appropriate process, including, but not limited to, centrifugation, spray drying, or freeze drying.

Spray Processes

In some embodiments, PGSU-based microparticles are made by a spray process. In exemplary embodiments, the spray process includes forming a composition containing PGS resin and a crosslinker and dispersing the composition in a moving stream of gas. In some embodiments, the composition also includes an API. In some embodiments, the composition also includes a catalyst.

In some embodiments, the spray process is a spray drying process. In some embodiments, the spray drying process includes forming a composition including PGS resin and a crosslinker in a solvent and concurrently spraying a gas and the composition. The composition may be a solution or a dispersion. Appropriate gases may include, but are not limited to, air or nitrogen. In exemplary embodiments, the concurrent spraying brings about rapid evaporation of the solvent and simultaneous drying of the PGS to form a dry microparticle. In some embodiments, the solution is atomized to get a controlled spray drop size.

In other embodiments, the spray process is a spray congealing process. Like spray drying, the composition is atomized. The composition may be a solution or a dispersion. In the spray congealing process, the solidification or "congealing" of the PGS resin is brought about by spraying the atomized composition into a non-solvent. Appropriate non-solvents for spray congealing include, but are not limited to, benzene, pentane, hexane, heptane, isooctane, cyclohexane, isooctane, xylene, or water. In some embodiments, the non-solvent contains crosslinker. In some embodiments, the PGS resin is thermally congealed by the crosslinking.

Appropriate temperatures for spray drying or spray congealing may include, but are not limited to, up to about 120° C., alternatively room temperature up to about 120° C., alternatively up to about 60° C., alternatively up to about 80° C., alternatively up to about 100° C., or any value, range, or sub-range therebetween.

In some embodiments, the composition for spray drying or spray congealing includes one or more dissolved or suspended APIs. In other embodiments, the API and PGS resin are separated. For example, the API dissolved or dispersed in a solvent may form an inner feed solution with a PGS resin solution forming an outer feed solution. The inner and outer feed solutions may then be coaxially sprayed, with the outer feed solution being fed radially through a nozzle around a nozzle feeding the inner feed solution, to atomize with the outer feed solution encapsulating the inner feed solution to encapsulate the API in the PGSU-based microparticle.

In other embodiments, a previously-formed emulsion or double-emulsion is spray dried or spray congealed to encapsulate an API in a PGSU-based microparticle.

In other embodiments, PGSU-based microparticles formed by a phase separation-coacervation process are spray dried or spray congealed to remove solvent.

In other embodiments, the spray process is an electrostatic spray drying process. The electrostatic spray drying process includes applying an electrostatic charge to a sprayed composition. The sprayed composition may be a solution or a dispersion. Formation of the PGSU-based microparticles is brought about by a difference in the polarity of the PGS resin, solvent, and API core.

In some embodiments, the spray process is an air suspension process. In some embodiments, the air suspension process includes forming solid API particles, dispersing the solid API particles in an upward gas stream, and spray coating the solid API particles with a PGSU-based solution to form PGSU-based microparticles with an API core. Appropriate sizes for the API particle may be, but are not limited to, less than about 100 μm, alternatively less than about 50 μm, alternatively less than about 20 μm, alternatively less than about 10 μm, or any value, range, or sub-range therebetween.

In some embodiments, the spray process includes a spray coating process, such as, for example, a Wurster process or a fluidized bed process. In some embodiments, the core particles pass through a region where they are spray-coated with a solution containing PGS resin. In some embodiments, the crosslinker is dissolved in the solution with the PGS resin. In other embodiments, the PGS resin solution is free of crosslinker, which is dissolved in a second solution that is sprayed separately from the PGS resin solution. In yet other embodiments, the crosslinker is split into both the PGS resin solution and the second solution. Similarly, the catalyst, when present, may be in the PGS resin solution, in a second solution sprayed separately with the PGS resin solution being free of catalyst, or split into both the PGS resin solution and a second solution. In exemplary embodiments, the gas stream used to suspend the core API particles also helps to dry the coated microparticles. In some embodiments, the PGSU-based coating is deposited on the suspended core API particles incrementally over tens to hundreds of coating cycles. The number of spray coating cycles applied can be controlled to obtain the desired coating thickness, and hence, particle size. This in turn can help to achieve desired API release profiles for in vitro or in vivo use.

In exemplary embodiments, the coating thickness, the API particle size, the crosslinking density, or a combination thereof are customized to achieve a predetermined release profile and/or degradation rate.

Post-Formation Processing and Use of Microparticles

In some embodiments, the PGSU-based microparticles are coated with a polymeric layer after formation. Appropriate polymers for the polymeric coating may include, but are not limited to, PGS, PGSU, PLGA, PLA, a polysaccharide, such as, for example, chitosan, alginate, or cellulose, a polyacrylate, polyvinyl pyrrolidone (PVP), or combinations thereof. In some embodiments, the polymeric layer contains an API. In other embodiments, the polymeric layer is unloaded and free of an API. An appropriate technique for applying the polymeric coating may include, but is not limited to, pan coating or fluidized bed coating. In some embodiments, the polymeric coating aids in controlling the release kinetics, such as, for example, to reduce or prevent an initial burst release. In some embodiments, the polymeric coating is a pH-sensitive coating for a specific targeted delivery, such as, for example, an acid sensitive coating of gelatin or chitosan for delivery of the microparticles to the acidic environment of a tumor.

In some embodiments, the PGSU-based microparticles are lyophilized prior to storage to improve shelf life for long-term storage.

In some embodiments, the PGSU-based microparticles are sterilized prior to in vitro or in vivo use. In some embodiments, the sterilization includes exposing the PGSU-based microparticles to gamma radiation. An appropriate dosage of gamma radiation may include, but is not limited to, about 18-34 kGy, alternatively about 25-34 kGy, alternatively about 18-29 kGy, or any value, range, or sub-range therebetween. Other appropriate sterilization techniques may include, but are not limited to, an electron beam, ethylene oxide, or sterile fill/finish.

In some embodiments, the PGSU-based microparticles are sized after formation and prior to use to obtain microparticles in a predetermined size range. Appropriate sizing techniques may include, but are not limited to, mechanical sieving, or sonic sieving. Micronized lactose or micronized sucrose may be used to assist with mechanical sieving or sonic sieving.

In some embodiments, the PGSU-based microparticles are sized to be drawn into the syringe of 21-gauge or larger needle for injection. As shown in Table 1, appropriate particle sizes for such PGSU-based microparticles may include, but are not limited to, up to about 300 μm to pass through a 22-gauge needle, alternatively up to about 212 μm to pass through a 23-gauge needle, alternatively up to about 106 μm to pass through a 27-gauge needle, or alternatively up to about 75 μm may pass through a 30-gauge needle.

TABLE 1

| Microparticle Size Range | Needle Passed Through |
|---|---|
| <43 μm | 30-Gauge and 27-Gauge |
| 43-75 μm | 30-Gauge and 27-Gauge |
| 75-106 μm | 27-Gauge, 23-Gauge, and 22-Gauge |
| 106-212 μm | 23-Gauge and 22-Gauge |
| 212-300 μm | 22-Gauge |

In some embodiments, the PGSU-based microparticles pass through a smaller diameter needle than conventional polymer microparticles of the same size due to their elastomeric nature and ability to elastically compress. In some embodiments, this leads to less clogging and bridging during injection. In some embodiments, however, the presence of the API decreases the elasticity of the PGSU-based microparticles, which may be taken into account when selecting a microparticle size range and/or syringe gauge.

In some embodiments, the stored PGSU-based microparticles are suspended in a suspension medium prior to use. In some embodiments, the suspended PGSU-based microparticles are injected for use. In other embodiments, the stored PGSU-based microparticles are converted to a hydrogel form prior to use. In some embodiments, suspension media for PGSU-based microparticles for injection are aqueous. Other solvent systems for microparticle injection may include, but are not limited to, dimethyl sulfoxide (DMSO), ethanol, or propylene glycol.

Appropriate suspension media for PGSU-based microparticles in the liquid state may include aqueous buffers including buffering agents. Appropriate buffering agents may include, but are not limited to, acetate, citrate, phosphate, tartrate, or tris(hydroxymethyl)aminomethane (Tris), to achieve a target buffered pH. In some embodiments, the suspending medium contains other components. Appropriate other components may include, but are not limited to, tonicity adjusting agents, viscosity building agents, stabilizers, solubility enhancers, bulking agents, preservatives, flocculating agents, wetting agents, or combinations thereof. An appropriate tonicity adjusting agent may include, but is not limited to, 0.5-5 wt % dextrose, glycerin, mannitol, or sodium chloride. An appropriate viscosity building agent may include, but is not limited to, 0.1-2 wt % carboxymethylcellulose (CMC), polyethylene glycol (PEG), or PVP. An appropriate stabilizer may include, but is not limited to, 0.1-5 wt % of a surfactant or 15-30 wt % poloxamers. Appropriate poloxamers may include, but are not limited to, Pluronic F-68, Kolliphor P 188, or Kolliphor P 338. Appropriate surfactants may include, but are not limited to, Polysorbate 80, Polysorbate 20, lecithin, Span 80, or Span 85. Appropriate solubility enhancers may include, but are not limited to, surfactants, such as, for example, tween, or co-solvents, such as, for example, propylene glycol, PEG, sorbitol, dimethylacetamide, or a polyethoxylated castor oil, such as marketed under the trade name Kolliphor (BASF Corporation, Ludwigshafen, Germany). Bulking agents may provide structure to the lyophilized cake. Appropriate bulking agents may include, but are not limited to, 1-5 wt % mannitol, sucrose, lactose, trehalose, PEG, or PVP. Appropriate preservatives may include, but are not limited to, antimicrobial agents, such as, for example, 0.5-2 wt % benzyl alcohol or 0.01-0.05 wt % benzalkonium chloride. Flocculating agents may help form controlled aggregates that are easily suspended before administration. Appropriate flocculation agents may include, but are not limited to, surfactants, such as, for example, 1-2 wt % Polysorbate 80, or electrolytes, such as, for example, sodium chloride, citrates, or acetates. Wetting agents may increase the wetting efficiency between the medium and the surface of the PGSU-based microparticles. Appropriate wetting agents may include, but are not limited to, nonionic surfactants having a hydrophilic lipophilic balance (HLB) values between 7-9.

In some embodiments, PGSU-based microparticles having a size in the range of about 106-212 μm are suspended at a concentration of up to about 3 wt % in an aqueous solution including about 2 wt % Tween 80, alternatively at a concentration of up to about 1 wt % in an aqueous solution including about 1 wt % Tween 80, or alternatively at a concentration of up to about 0.5 wt % in an aqueous solution including about 0.5 wt % Tween 80.

In other embodiments, PGSU-based microparticles having a size of up to about 75 μm are suspended at a concentration of about 1 wt % in an aqueous solution including about 1-2 wt % Tween 80 or Tween 20 or alternatively at a concentration of about 0.5 wt % in an aqueous solution including about 0.5 wt % solution of Tween 80 or Tween 20.

In other embodiments, PGSU-based microparticles having a size of up to 75 μm are suspended at a concentration of about 5 wt % in an aqueous solution including 0.1-1 wt % sodium CMC and 0.1-0.5 wt % Tween 80.

In other embodiments, PGSU-based microparticles are embedded in a gel during formulation or suspended in media that forms a gel in situ. In some embodiments, the gel is a hydrogel. Such gels may be formed by physical or chemical interactions. Physically crosslinked gels may be formed by hydrogen bonding, hydrophobic interactions, charge interactions, or complexation. Appropriate polymers to form gels may include, but are not limited to, PGS, chitosan, alginate, gelatin, hyaluronic acid, CMC, or poly(N-iso-propylacrylamide) (PNIPAM). APIs may be loaded into PGSU-based microparticles as well as the surrounding gel.

In other embodiments, PGSU-based microparticles loaded with two or more APIs are suspended to form a dose or bolus. Such embodiments permit the separate loading of APIs that may interact adversely, either physically or chemically, in the same dose or bolus. Such embodiments also permit the administration of accurate doses of API based on the weight ratios of microparticles in the bolus.

In other embodiments, PGSU-based microparticles of different crosslinking densities are suspended to form a dose or bolus. Such embodiments provide the ability to control the time and rate of release of the API based on the release kinetics.

In other embodiments, PGSU-based microparticles with a polymeric coating are suspended to form a dose or bolus. Such embodiments provide the ability to controlling the release kinetics of an API by reducing or preventing an initial burst release.

In other embodiments, PGSU-based microparticles of different particle sizes are suspended to form a dose or bolus. Since PGSU-based microparticles of smaller average size have a higher surface area-to-volume ratio than PGSU-based microparticles with larger average size, smaller microparticles release faster than larger microparticles of the same crosslinking density and API loading. Such embodiments provide the ability to control the release kinetics of the API.

In other embodiments, a dose or bolus contains two or more of PGSU-based microparticles loaded with two or more APIs, PGSU-based microparticles with different crosslinking densities, and PGSU-based microparticles with different particle sizes to control release kinetics or degradation rate.

In other embodiments, a mixture of PGSU-based microparticles and other polymer microparticles is suspended to form a dose or bolus. Appropriate other polymers may include, but are not limited to, PLA, PLGA, PCL, PVP, alginate, or chitosan. For example, degradation of a bulk eroding polymer such as PLA may cause an acidic microenvironment to speed up the release from and degradation of the PGSU-based microparticles.

In some embodiments, the PGSU-based microparticles are administered subcutaneously, intramuscularly, intraarticularly, intracochlearly, intravitreally, intracamerally, episclerally, intravaginally, transdermally, or intravenously.

In other embodiments, a capsule is loaded with PGSU-based microparticles for oral, sublingual, buccal, rectal, or intravaginal delivery.

In other embodiments, a tablet of suitable size for oral, buccal, sublingual, intravaginal, or rectal delivery includes compressed PGSU-based microparticles. In some embodiments, the tablet also includes one or more excipients. Appropriate excipients for compression in a tablet may include, but are not limited to, starch, cellulose, lactose, PVP, gelatin, or waxes.

In other embodiments, PGSU-based microparticles are delivered intranasally. In some embodiments, the PGSU-based microparticles are suspended in a liquid vehicle and administered through a nebulizer. In other embodiments, the PGSU-based microparticles are administered as a powder in air by an inhaler. Intranasal delivery may be especially useful for APIs acting on the central nervous system, as delivery through the nasal mucous bypasses the blood brain barrier.

In other embodiments, PGSU-based microparticles are incorporated into microneedle designs, such as, for example, microneedle arrays, microneedle patches, solid microneedles, hollow microneedles, detachable microneedles, or biodegradable microneedles. The microneedle body may be metal or polymeric. If metal, the microneedle body may be stainless steel. If polymeric, the microneedle body may be composed of PGS, PGSU, PCL, PLA, PGA, PLGA, PDMS, polyurethane (PU), thermoplastic polyurethane (TPU), ethylene-vinyl acetate (EVA), collagen, gelatin, chitosan, alginate, hyaluronic acid, or other natural or synthetic polymers, or combinations thereof. In some embodiments, the PGSU-based microparticles are dispersed within the polymeric microneedle body. In some embodiments, the PGSU-based microparticles include a coating applied onto the outer surface of the microneedle body. In some embodiments, the PGSU-based microparticles reside within the hollow center of the microneedle body.

EXAMPLES

The invention is further described in the context of the following examples which are presented by way of illustration, not of limitation.

The PGS resins used in the following examples typically displayed a weight average molecular weight in the range of 13,500 to 18,000 Da and a polydispersity index in the range of 6.5 to 12.

Example 1

PGSU-based microparticles were manufactured in an emulsification-solvent evaporation process, where the emulsification was with an overhead dissolver stirrer. The continuous phase included about 300 g mineral oil (32 cP at 20° C.) with 5% Span 85. The stirrer speed was set to 600 rpm. Crosslinker (HDI) and tin catalyst were then dissolved in the mineral oil. The PGS resin was dissolved in acetone at about 50 wt %. The dispersed phase was then added dropwise to the continuous phase at a rate of about 5 mL/min at room temperature. The weight ratio of the dispersed phase to the continuous phase was about 1:20. The hydroxyl groups of the PGS resin in the formed emulsion droplets reacted with crosslinker as it partitioned from the mineral oil to the acetone to form PGSU. About twenty minutes after the emulsification, the temperature was raised to about 70° C. After curing was completed, the PGSU-based microparticles were collected by centrifugation and washed with heptane. The PGSU-based microparticles were dried at 40° C. under a pressure of 10 Torr for 3 days. Table 2 shows certain physical properties of three different sets of PGSU-based microparticles manufactured in an emulsification-solvent evaporation process with different PGS-to-crosslinker ratios and hence different crosslinking densities.

TABLE 2

| Example | PGS:HDI weight ratio | NCO:OH stoichiometric ratio | Average size (μm) | Span Value | Residual Acetone (wt %) | Residual Heptane (wt %) |
|---|---|---|---|---|---|---|
| 1A | 2:1 | 1:0.6 | 75.4 | 1.09 | 0.195 | 0.072 |
| 1B | 3.5:1 | 1:1 | 73.9 | 1.11 | 0.248 | 0.038 |
| 1C | 5:1 | 1:1.4 | 74.2 | 1.25 | 0.238 | 0.039 |

Figure 2:
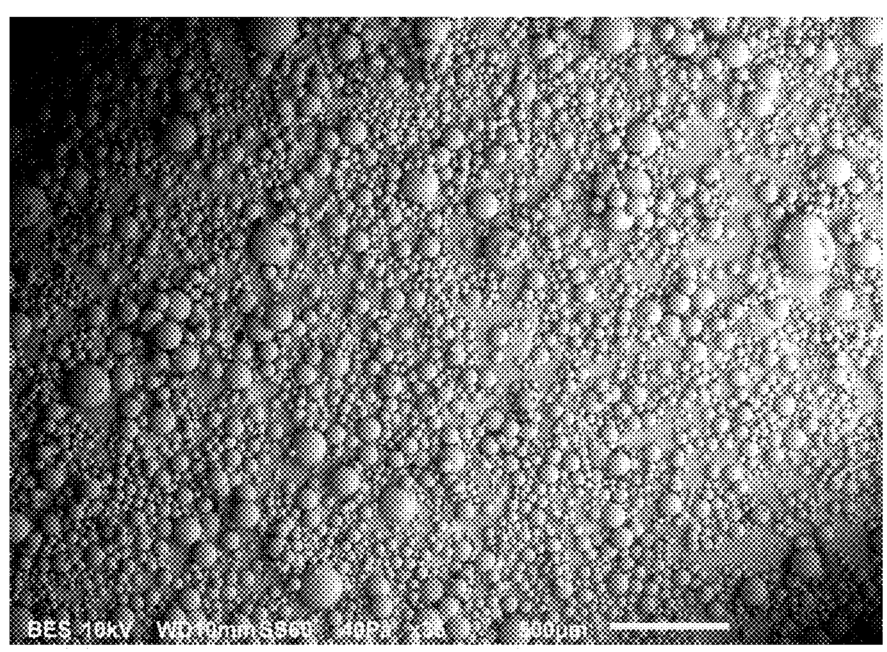
FIG. 2 shows an image of PGSU-based microparticles.

FIG. 2 shows an image of the PGSU-based microparticles of Example 1A. PGSU particle size was measured by laser diffraction. The change in crosslinking densities did not affect the average particle size or span values. As recommended for Class III residual solvents, the amount of residual acetone and heptane content was less than 0.5% by weight as measured by thermogravimetric analysis (TGA).

Figure 3:
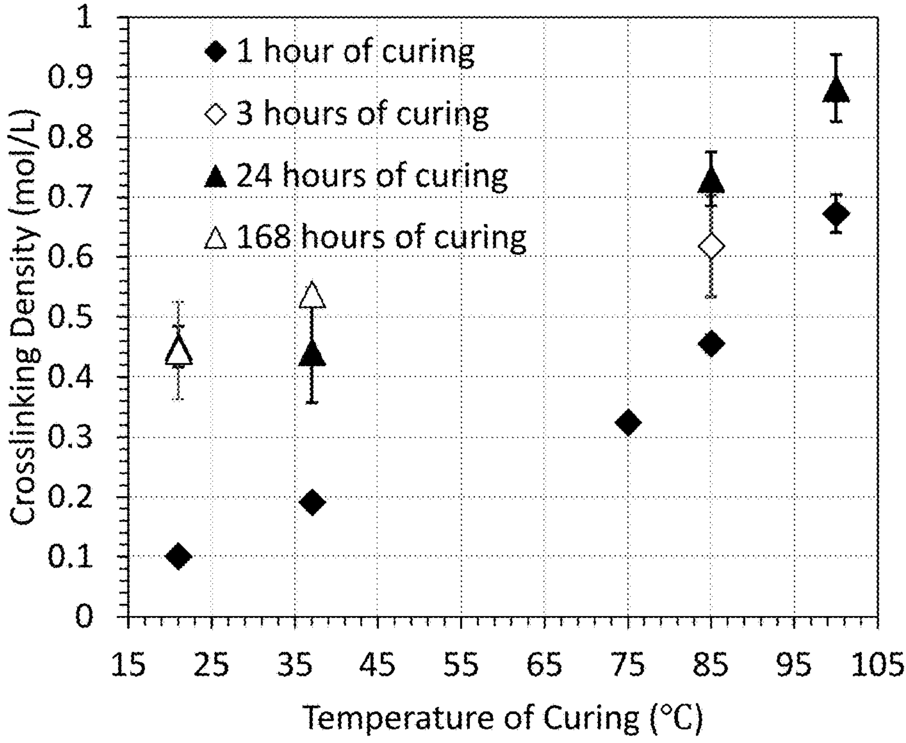
FIG. 3 shows the crosslinking density for PGSU at different cure temperatures and cure times.

The curing time and curing temperature were varied over the ranges of 1-168 hours and 20-100° C., respectively, to determine their effect on the crosslinking density of PGSU-based microparticles formed by emulsification-solvent evaporation in an acetone/mineral oil system. The concentration of PGS resin in the dispersed phase was 50 wt %, the PGS:HDI weight ratio was 2:1, the PGS:tin catalyst weight ratio was 400:1, and the dispersed phase:continuous phase weight ratio was 1:10. The crosslinking density was measured using swell test on unloaded PGSU-based microparticle. The swell test was performed in tetrahydrofuran (THF). FIG. 3 shows that higher temperatures gave higher crosslinking densities, and longer cure times also gave higher crosslinking densities, but higher temperatures were more effective than longer curing times at increasing the crosslinking densities.

Similarly, the PGS resin concentration in the dispersed phase was varied to determine its effect on the crosslinking density of PGSU-based microparticles formed by emulsification-solvent evaporation in an acetone/mineral oil system. The PGSU-based microparticles were cured at 80° C. for 1 hour. The crosslinking density for 25 wt % PGS was about 0.33 mol/L. The crosslinking density for 40 wt % PGS was about 0.40 mol/L. The crosslinking density for 50 wt % PGS was about 0.46 mol/L. Increasing the concentration of PGS resin in the dispersed phase increased the crosslinking density of the PGSU-based microparticles.

Example 2

Figure 4:
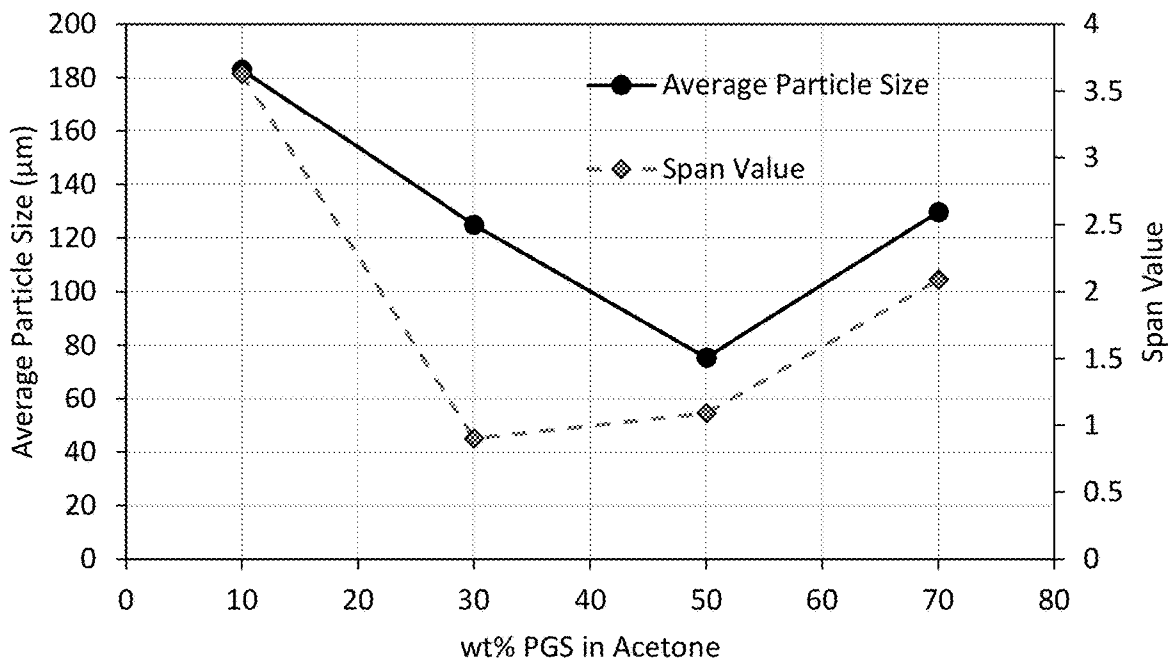
FIG. 4 shows the average particle size and span value of formed PGSU microparticles for different starting concentrations of PGS in acetone.

PGSU microparticles were manufactured by emulsification-solvent evaporation using a dissolver overhead stirrer as in Example 1. Different concentrations of PGS solutions made in acetone were used as the dispersed phase. Mineral oil having a viscosity 32 cP at 20° C. was used as the continuous phase. Particle size and span values were measured using laser diffraction. As shown in FIG. 4, the particle size and span value decrease with an increase in PGS concentration in acetone, up to 50 wt % PGS concentration, after which particle size and span values increase again. 50 wt % PGS in acetone can be considered as a preferred PGS solution for PGSU microspheres manufacturing by emulsification-solvent evaporation process.

Figure 5:
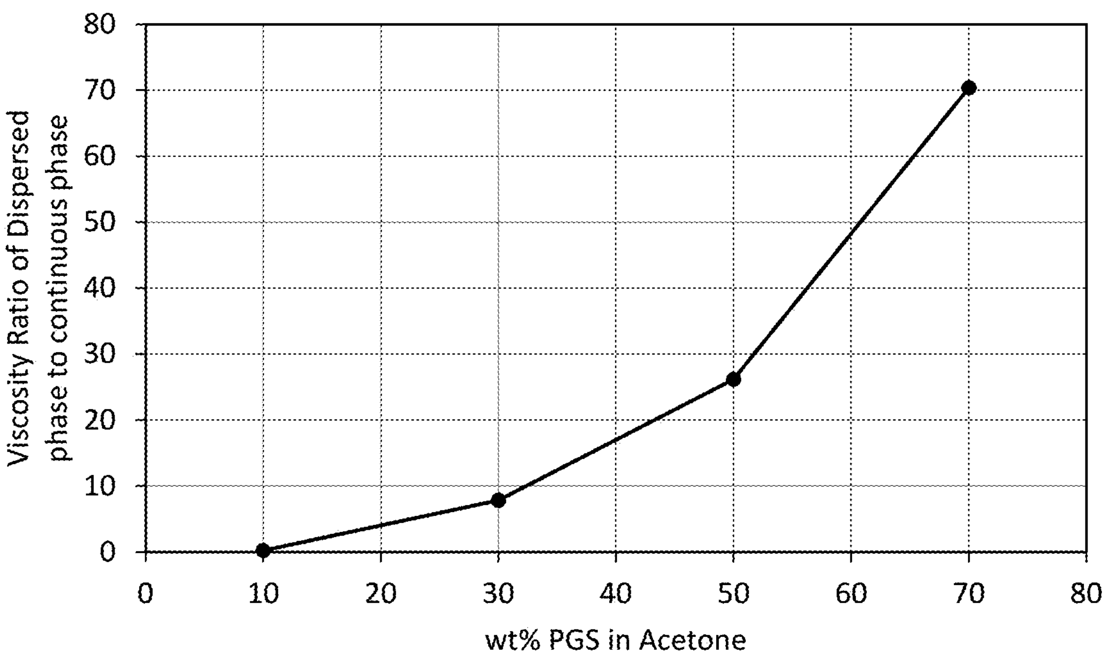
FIG. 5 shows the viscosity ratio of the dispersed phase to the continuous phase for different starting concentrations of PGS in the dispersed phase.

The viscosity of the dispersed phase with varying PGS concentrations in acetone and viscosity of the continuous phase mineral oil were measured by rotational rheometry at 20° C. The ratio of the viscosity of the dispersed phase to the continuous phase was plotted against wt % PGS concentration in acetone. The viscosity ratio of the dispersed phase to the continuous phase increases with increase in wt % PGS, as shown in FIG. 5. A viscosity ratio of 25:1 through 30:1 of dispersed phase to continuous phase, which occurs at 50 wt % PGS solution concentration in acetone, was found to provide the smallest particle size of PGSU microparticles using the process of emulsification-solvent evaporation.

Example 3

Figure 6:
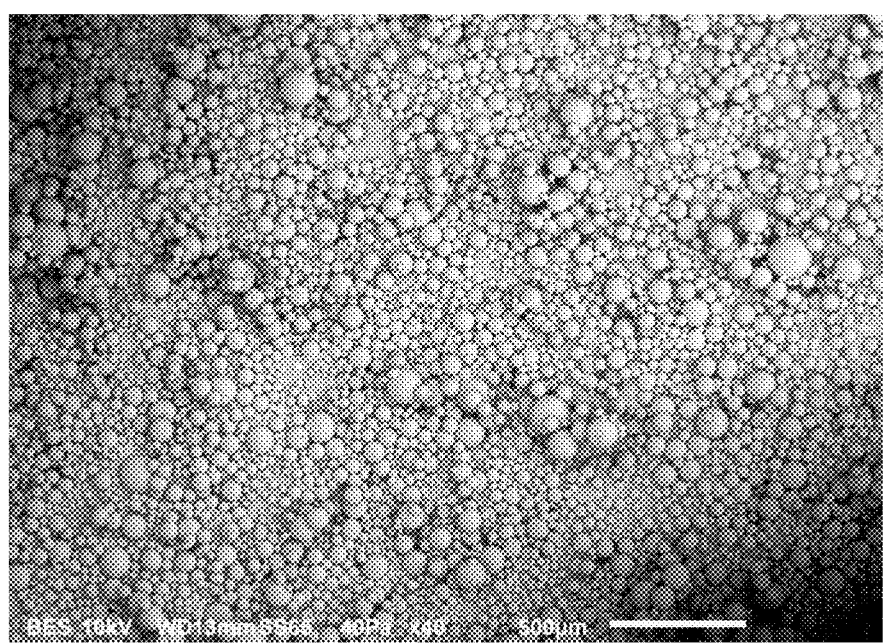
FIG. 6 shows another image of PGSU-based microparticles.

PGSU-based microparticles were manufactured by a membrane emulsification-solvent evaporation process in an LDC-1 dispersion cell (Micropore Technologies Ltd.) with a 10-μm hydrophilic membrane for membrane emulsification. Batches were formed at various PGS concentration, injection rate, and stirrer speed to determine the effect of those parameters on the resulting PGSU-based microparticle. The continuous phase included 2.5 wt % Span 85 in mineral oil (32 cP at 20° C.), crosslinker (HDI) (PGS:HDI weight ratio=2:1), and tin catalyst (PGS:tin catalyst weight ratio=400:1). The weight ratio of the dispersed phase to the continuous phase was 1:20. FIG. 6 shows an image of PGSU-based microparticles of Example 3. The dispersed phase included PGS resin in acetone at a concentration of 20-50 wt %. The dispersed phase was injected at a rate of 0.1-0.5 mL/min with a stirrer speed 785-1500 rpm at room temperature. The emulsion was stirred in the dispersion cell for 20-60 minutes. The PGSU microparticles were transferred to a beaker and cured at 40° C. for 1 hour under stirring with a straight blade stirrer. After curing was completed, the PGSU-based microparticles were collected by centrifugation and washed with heptane. The PGSU-based microparticles were dried at 40° C. under a pressure of 10 Torr for 3 days. The particle sizes were measured by laser diffraction.

Figure 7A:
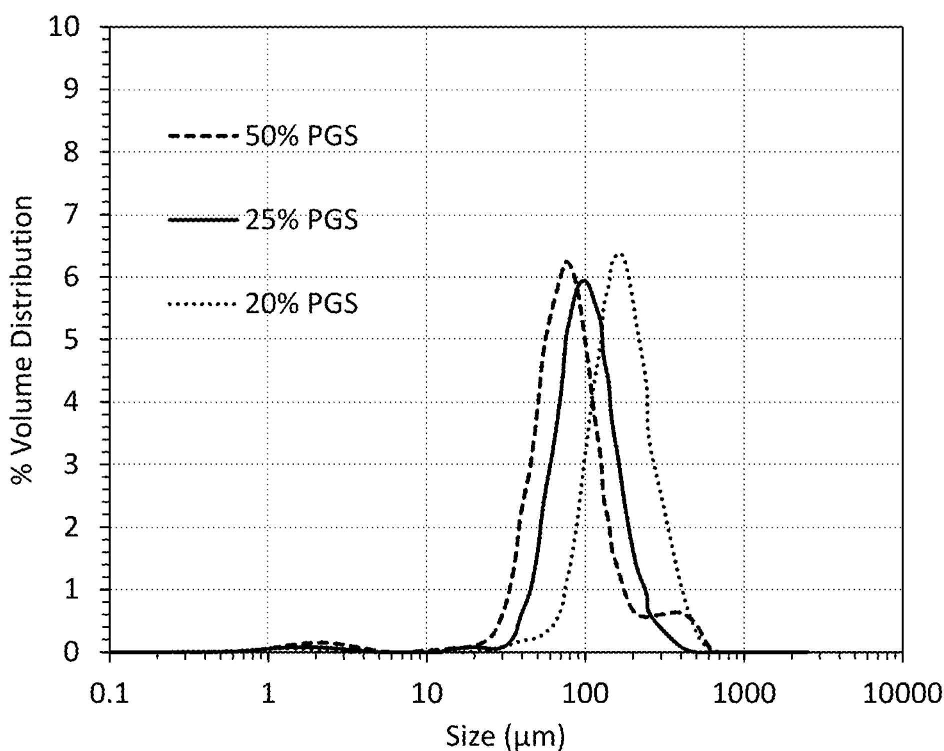
FIG. 7A shows the effect of PGS concentration on PGSU particle size distribution for low PGS concentrations in a membrane emulsification-solvent evaporation process.

FIG. 7A shows the effect of PGS concentration on particle size in a membrane emulsification-solvent evaporation process. Increasing the PGS concentration in the dispersed phase over the range of 20 to 50 wt % increased the viscosity of the dispersed phase, which increased the dispersed phase viscosity:continuous phase viscosity ratio. The higher this viscosity ratio was during membrane emulsification, the smaller the obtained microparticles were. Hence a shift to lower particle size was seen as the PGS concentration was increased.

Figure 7B:
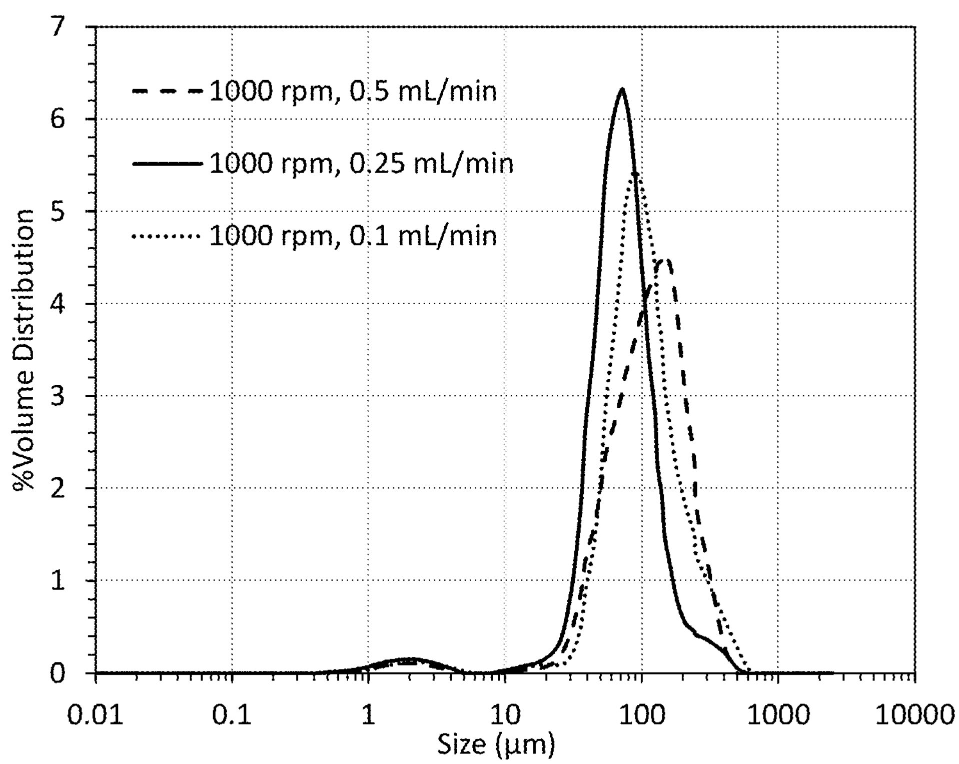
FIG. 7B shows the effect of injection rate on PGSU particle size distribution in a membrane emulsification-solvent evaporation process.

FIG. 7B shows the effect of injection rate on particle size in a membrane emulsification-solvent evaporation process. At a stirrer speed of 1000 rpm, intermediate injection rate over the range of 0.1 to 0.5 mL/min was most efficient in getting smaller particle sizes for PGSU microparticles.

Figure 7C:
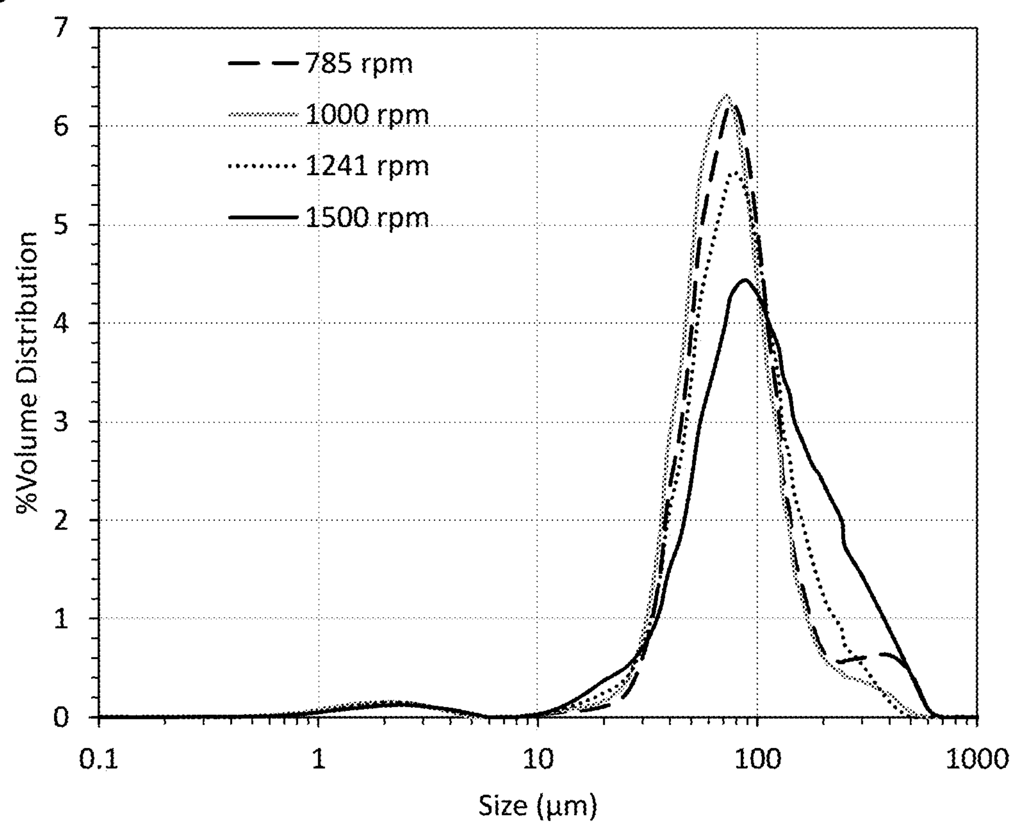
FIG. 7C shows the effect of stir speed on PGSU particle size distribution in a membrane emulsification-solvent evaporation process.

FIG. 7C shows the effect of LDC-1 stirrer speed on particle size in a membrane emulsification-solvent evaporation process. At an injection rate of 0.25 mL/min, an intermediate stirring speed over the range of 785 to 1500 rpm was most efficient in getting smaller particle sizes for PGSU microparticles.

Example 4

Figure 8:
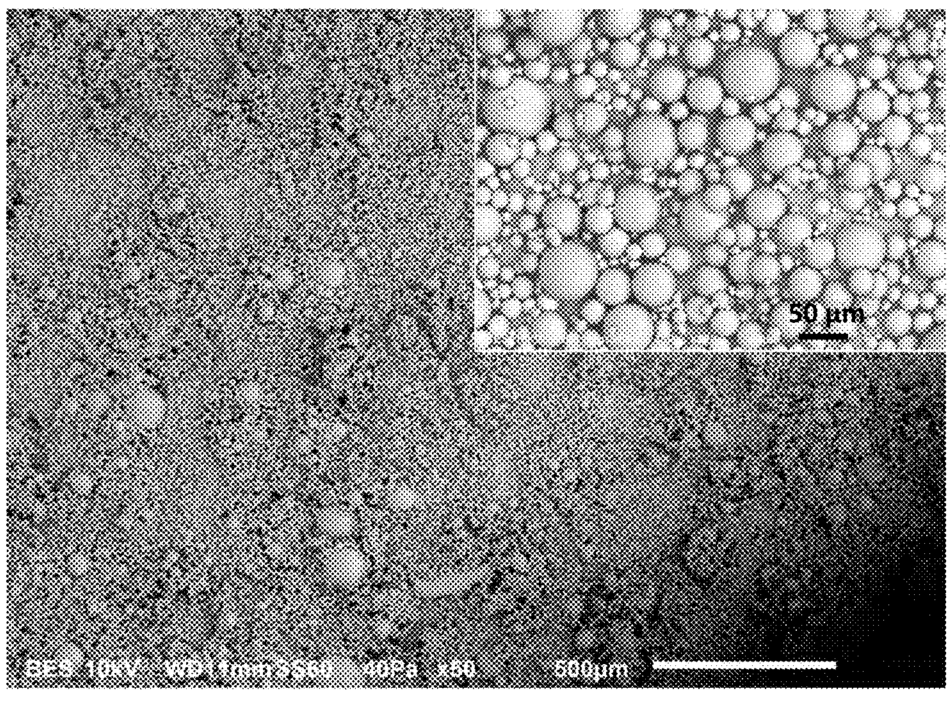
FIG. 8 shows another image of PGSU-based microparticles.

PGSU-based microparticles were manufactured by a membrane emulsification-solvent evaporation process in an LDC-1 dispersion cell with a 3-μm hydrophilic membrane for membrane emulsification. The dispersed phase included PGS resin in acetone at a concentration of 50-70 wt %. The continuous phase included 3 wt % Span 85 in mineral oil (32 cP at 20° C.), crosslinker (HDI) (PGS:HDI ratio by weight=2:1), and tin catalyst (PGS:tin catalyst ratio by weight=400:1). The weight ratio of the dispersed phase to continuous phase was 1:20. FIG. 8 shows an image of PGSU-based microparticles of Example 4. The dispersed phase was injected at a rate of 0.1 mL/min with a stirrer speed of 1000-1200 rpm at room temperature. The emulsion was stirred in the dispersion cell for 3-6 hours. The PGSU microparticles were then cured at 40° C. for 1 hour. After the curing was complete, the PGSU-based microparticles were collected by centrifugation and washed with heptane. The PGSU-based microparticles were dried at 40° C. under a pressure of 10 Torr for 3 days. Table 3 shows the average particle size for three different sets of PGSU-based microparticles from different PGS concentrations.

TABLE 3

| Example | PGS concentration (wt %) | Average size (μm) |
|---|---|---|
| 4A | 50 | 62.1 |
| 4B | 60 | 52.7 |
| 4C | 70 | 39.6 |

PGSU particle size was measured by laser diffraction. Table 3 shows that increasing the concentration of PGS in the dispersed phase reduced the average particle size. The PGSU-based microparticles of Example 4 manufactured by membrane emulsification-solvent evaporation with a 3-μm hydrophilic membrane were smaller than the ones of Example 3 manufactured with a 10-μm hydrophilic membrane or of Example 1 manufactured by emulsification by overhead stirrer.

Figure 9:
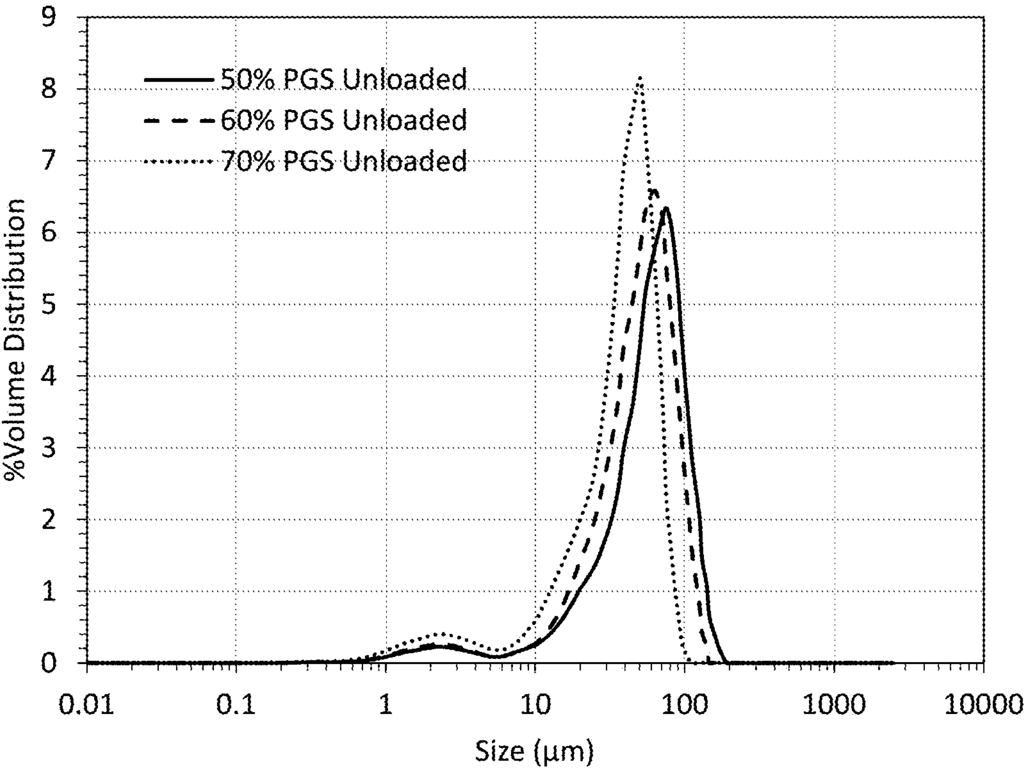
FIG. 9 shows the effect of PGS concentration on PGSU particle size distribution for high PGS concentrations.

FIG. 9 shows the effect of PGS concentration on particle size. Increasing the PGS concentration in the dispersed phase over the range of 50 to 70 wt % increased the viscosity of the dispersed phase, which increased the dispersed phase viscosity:continuous phase viscosity ratio. Increasing the dispersed phase viscosity:continuous phase viscosity ratio for membrane emulsification decreased the particle size of the obtained microparticles. Hence a shift to lower particle size from 62.1 μm to 52.7 μm to 39.6 μm was seen as the PGS concentration was increased from 50 wt % to 60 wt % to 70 wt %.

Example 5

PGSU-based microparticles were manufactured by an extrusion-spheronization process. PGS was separately mixed with crosslinker (HDI) and tin catalyst (PGS:tin catalyst ratio by weight=400:1) and filled into a dual barrel syringe. The spheronization bath contained 3% Span 85 in mineral oil of viscosity 4 cP at 100° C. The crosslinker and catalyst amounts were split 1:1, based on the total weights of each, between the extrudate and the spheronization bath. The extrusion was carried out with an air cylinder at 10 psi. The PGSU-based microparticles were then cured at 100° C. for 2 hours. The PGSU-based microparticles were then washed with heptane with intermittent sonication and centrifugation to remove the solvents, catalyst, and unreacted isocyanate crosslinker used during the manufacturing process. The washed microparticles were dried at 40° C. under vacuum for 3 days. Table 4 shows certain physical properties of three different sets of PGSU-based microparticles with different crosslinking densities.

TABLE 4

| Example | PGS:HDI weight ratio | NCO:OH stoichiometric ratio | Average Particle size (μm) | Span Value | Residual Heptane (wt %) |
|---|---|---|---|---|---|
| 5A | 2:1 | 1:0.6 | 81.2 | 2.97 | 0.098 |
| 5B | 3.5:1 | 1:1 | 73.9 | 2.00 | 0.078 |
| 5C | 5:1 | 1:1.4 | 50.3 | 1.69 | 0.035 |

Figure 10:
FIG. 10 shows another image of PGSU-based microparticles.

FIG. 10 shows an image of PGSU-based microparticles of Example 5A. PGSU particle size was measured by laser diffraction. The particle size decreased as the PGS:HDI weight ratio increased. The lower PGS:HDI weight ratio also meant that the extrudate was less crosslinked which allowed the spheronization bath to break it down to smaller pellets.

Example 6

PGSU-based microparticles were manufactured by scaling up the extrusion-spheronization process of Example 5 in a 500-mL reactor. PGS was separately mixed with crosslinker (HDI, PGS:HDI ratio by weight=3.5:1, NCO:OH stoichiometric ratio=1:1) and tin catalyst (PGS:tin catalyst ratio by weight=400:1) and filled into a dual barrel syringe. The spheronization bath contained 5 wt % Span 85 in 300 g mineral oil of viscosity 105 cP at 20° C. The crosslinker and catalyst amounts were split 1:1 between the extrudate and the spheronization bath. The weight ratio between extrudate to spheronization bath was 1:20. The extrusion was carried out with an angled air cylinder at 10 psi. A dissolver stirrer was used to break up the extrudate. The PGSU-based microparticles were then cured at varying temperatures for 2 hours. The PGSU-based microparticles were then washed with heptane with intermittent sonication and centrifugation to remove the solvents, catalyst, and unreacted isocyanate crosslinker used during the manufacturing process. The washed microparticles were dried at 40° C. at 10 Torr for 3 days. Table 5 shows particle sizes and span values for three different sets of PGSU-based microparticles with different processing temperatures, each made in a 500-mL reactor. Surprisingly, scaling up reduced the average particle size and span value of microparticles produced. Increasing the spheronization bath temperature also resulted in smaller average particle size and lower span values, with a 100° C. spheronization bath temperature yielded the smallest average particle size.

TABLE 5

| Example | Spheronization Bath Temperature (° C.) | Average Particle Size (μm) | Span Value |
|---|---|---|---|
| 6A | 100 | 44.95 | 1.89 |
| 6B | 80 | 52.04 | 1.50 |
| 6C | 60 | 102.14 | 4.11 |

Example 7

Figure 11A:
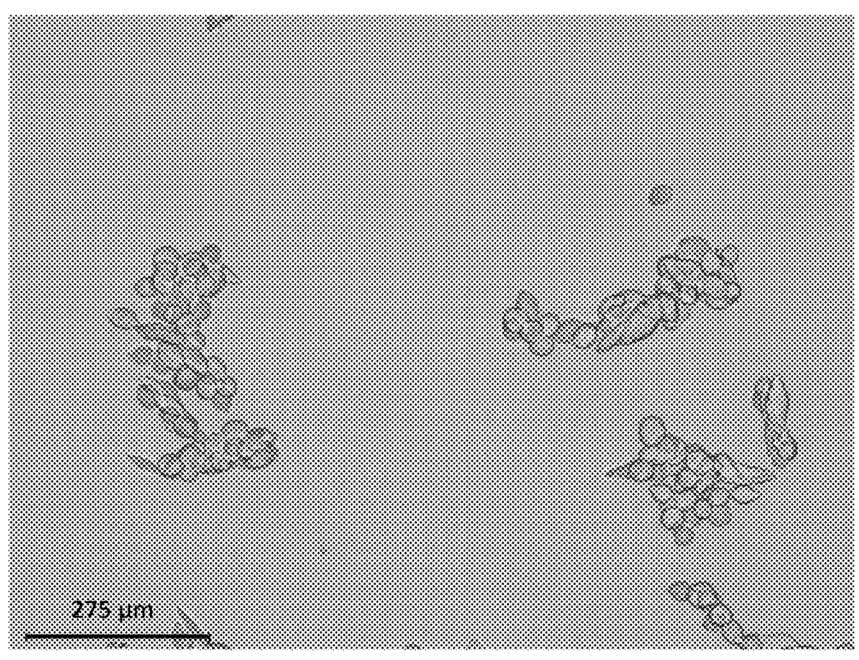
FIG. 11A shows an image of PGSU-based microparticles formed with stirring in an open beaker.

PGSU-based microparticles were manufactured by a phase separation-coacervation process with ethyl acetate as the solvent and heptane as the non-solvent. PGS resin was dissolved in ethyl acetate at a concentration of 10 wt %. The crosslinker (HDI) (PGS:HDI ratio by weight=2:1) was dissolved in ethyl acetate. The catalyst (PGS:tin catalyst ratio by weight=800:1) was dissolved in heptane. The ethyl acetate:heptane volume ratio was 8:1. The heptane solution was added dropwise to the ethyl acetate solution while stirring at 700 rpm with a magnetic stir bar at room temperature. The stirring was continued for 20 hours. One set of PGSU-based microparticles was manufactured in a beaker, causing faster evaporation of the solvent and giving the larger PGSU-based microparticles shown in FIG. 11A of about 25-40 μm in size.

Figure 11B:
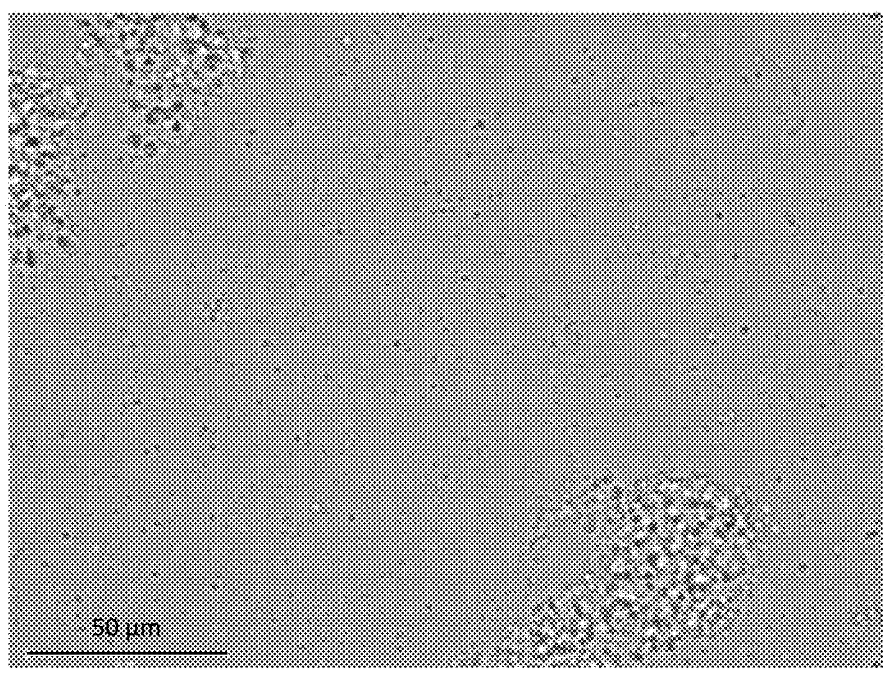
FIG. 11B shows an image of PGSU-based microparticles formed with stirring in a stoppered flask.

Another set of PGSU-based microparticles was manufactured in a stoppered flask with slower, more controlled evaporation, leading to the smaller PGSU-based microparticles shown in FIG. 11B of about 1-2 μm in size. The faster evaporation of the ethyl acetate in the open beaker compared to the stoppered flask led to phase separation of PGS polymer chains or crosslinking PGS polymer chains onto one another, giving larger microparticles.

Example 8

Figure 12:
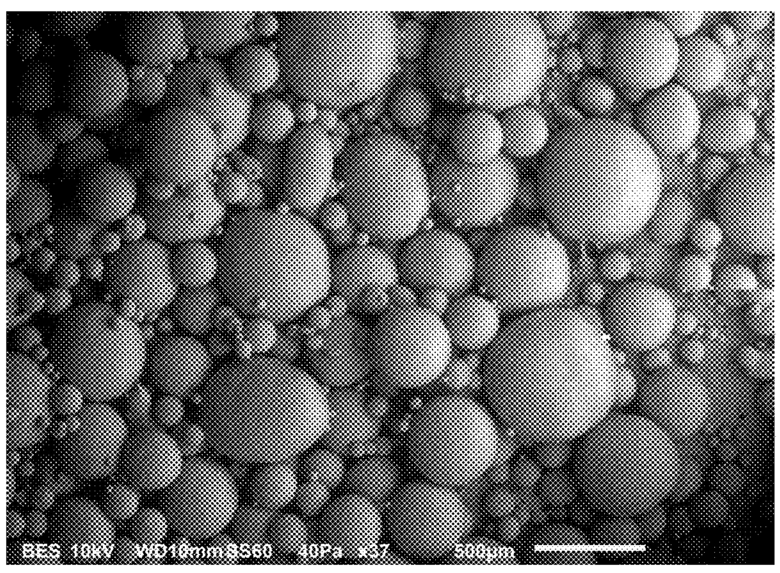
FIG. 12 shows an image of PGSU-based microparticles loaded with 26 wt % 2'-deoxyadenosine.
Figure 13:
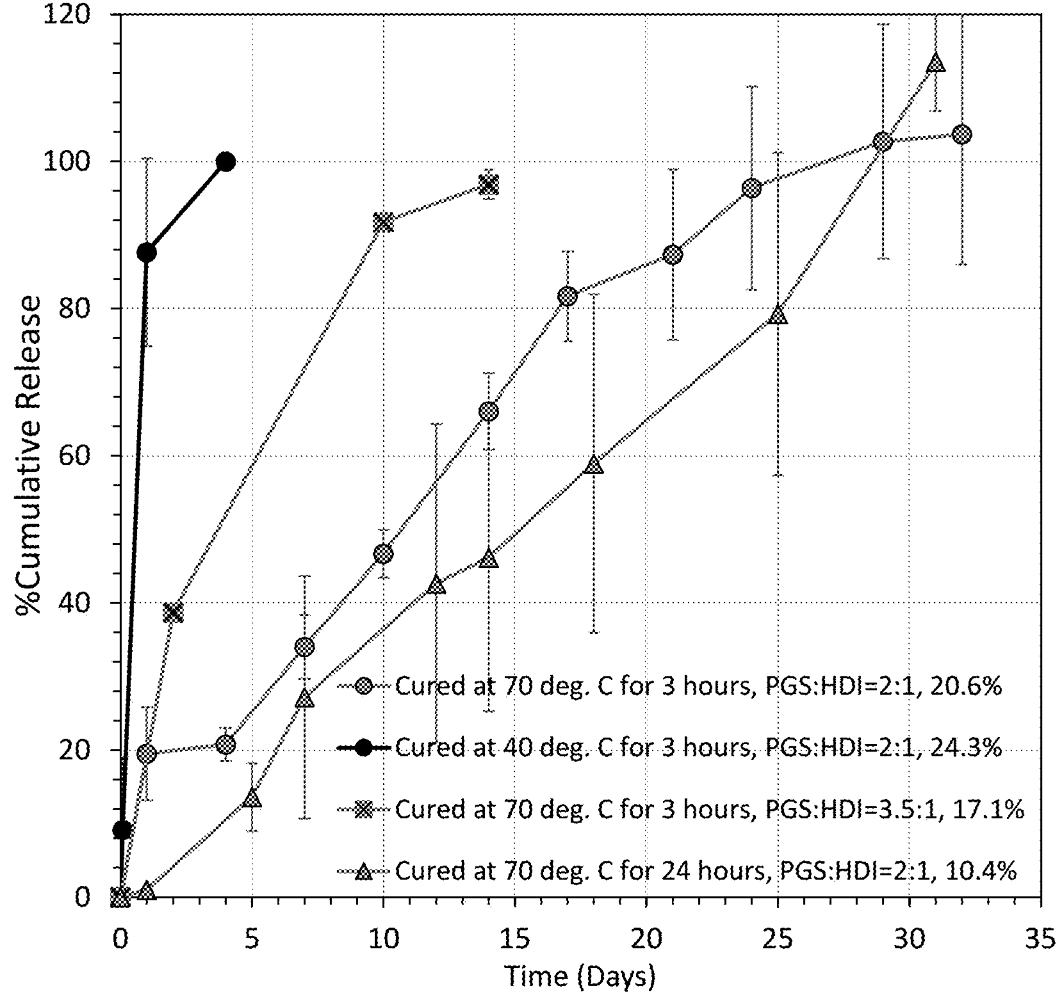
FIG. 13 shows in vitro release curves for 2'-deoxyadenosine-loaded PGSU-based microparticles with different cure times, cure temperatures, and PGS:HDI ratios.

PGSU-based microparticles loaded with 26 wt % 2'-deoxyadenosine as a water-soluble API were manufactured by an emulsification-solvent evaporation process. Micronized 2'-deoxyadenosine was suspended in 50% PGS resin in an acetone solution. The crosslinker (HDI) and tin catalyst were present in the mineral oil. The PGS:tin catalyst weight ratio was 400:1. The PGSU-based microparticles were formed based on a PGS:HDI weight ratio of either 2:1 or 3.5:1 (NCO:OH stoichiometric ratio of either 1:0.6 or 1:1, respectively). The acetone phase was emulsified in mineral oil with 3 wt % Span 85 with an overhead stirrer at 800 rpm. The microparticles were cured at either 40 or 70° C. for either 3 or 24 hours. PGSU-based microparticles with a PGS:HDI weight ratio of 2:1 cured at 70° C. for 3 hours or 24 hours release 2'-deoxyadenosine in 1 month. The resulting PGSU-based microparticles loaded with 26 wt % 2'-deoxyadenosine were mostly spherical or oval, as shown in FIG. 12. Some API crystals were seen to cause surface roughness on some of the PGSU-based microparticles. The microparticles were otherwise mostly spherical or oval. FIG. 13 shows in vitro release curves of the resulting loaded PGSU-based microparticles in 0.1 M PBS at 37° C. FIG. 13 shows that increasing the cure time at a particular temperature does not increase crosslinking density or slow down release. The PGSU-based microparticles with a PGS:HDI weight ratio of 3.5:1 (NCO:OH stoichiometric ratio of 1:1) were less crosslinked than the PGSU-based microparticles with a PGS:HDI weight ratio of 2:1 (NCO:OH stoichiometric ratio of 1:0.6) for the same cure conditions of 70° C. for 3 hours, and they released the API in two weeks as opposed to one month. The PGSU-based microparticles cured at 40° C. were less crosslinked than the ones cured at 70° C. for the same cure time of 3 hours and a PGS:HDI weight ratio of 2:1 and released the API in four days as opposed to one month. In this case, the cure temperature had a greater effect on crosslinking density, and hence the time of release, as compared to the cure time and PGS:HDI ratio for the conditions used.

Figure 14A:
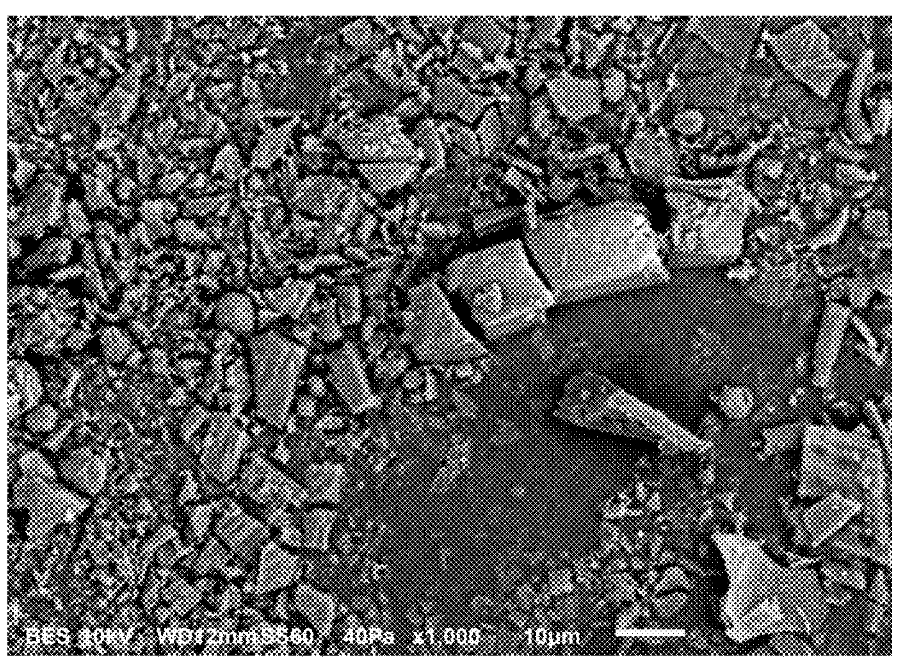
FIG. 14A shows an image of micronized 2'-deoxyadenosine particles.
Figure 14B:
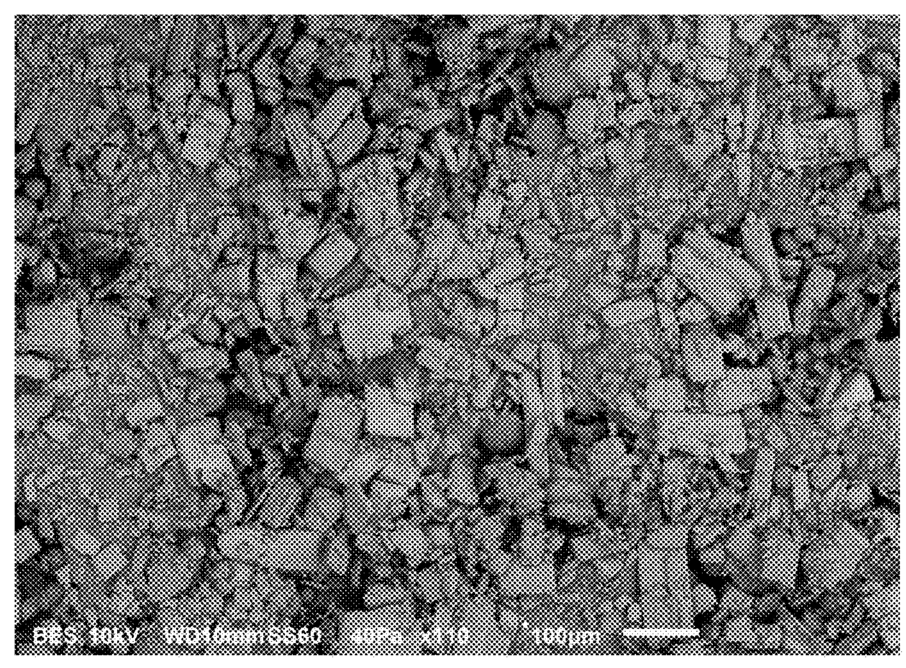
FIG. 14B shows an image of large, non-micronized 2'-deoxyadenosine particles.
Figure 15A:
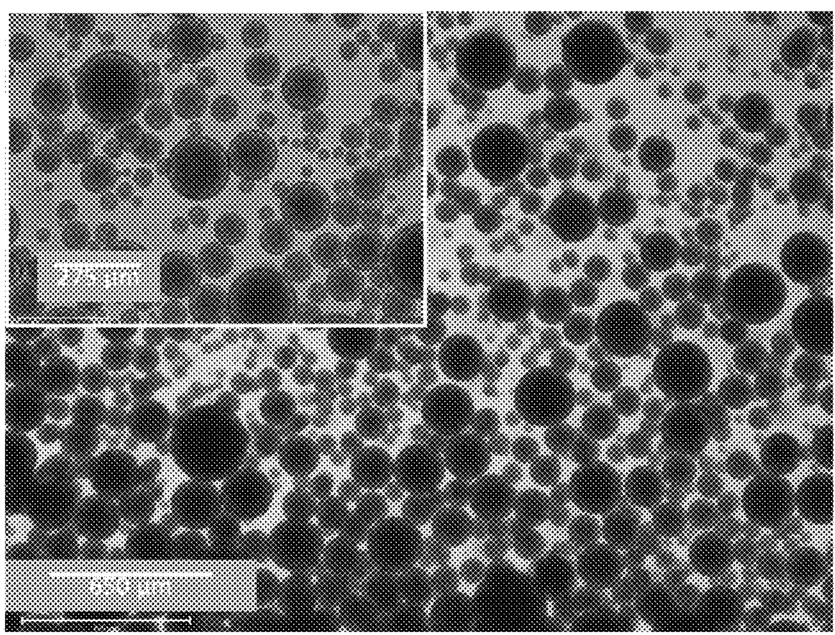
FIG. 15A shows an optical microscopy image of PGSU-based microparticles with micronized API particles in mineral oil.
Figure 15B:
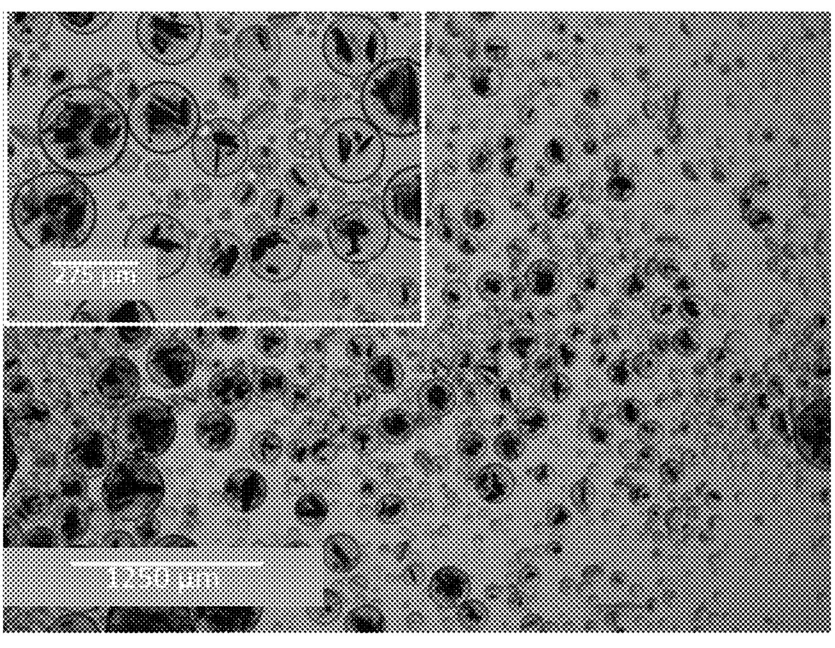
FIG. 15B shows an optical microscopy image of PGSU-based microparticles with large API particles in mineral oil.
Figure 16:
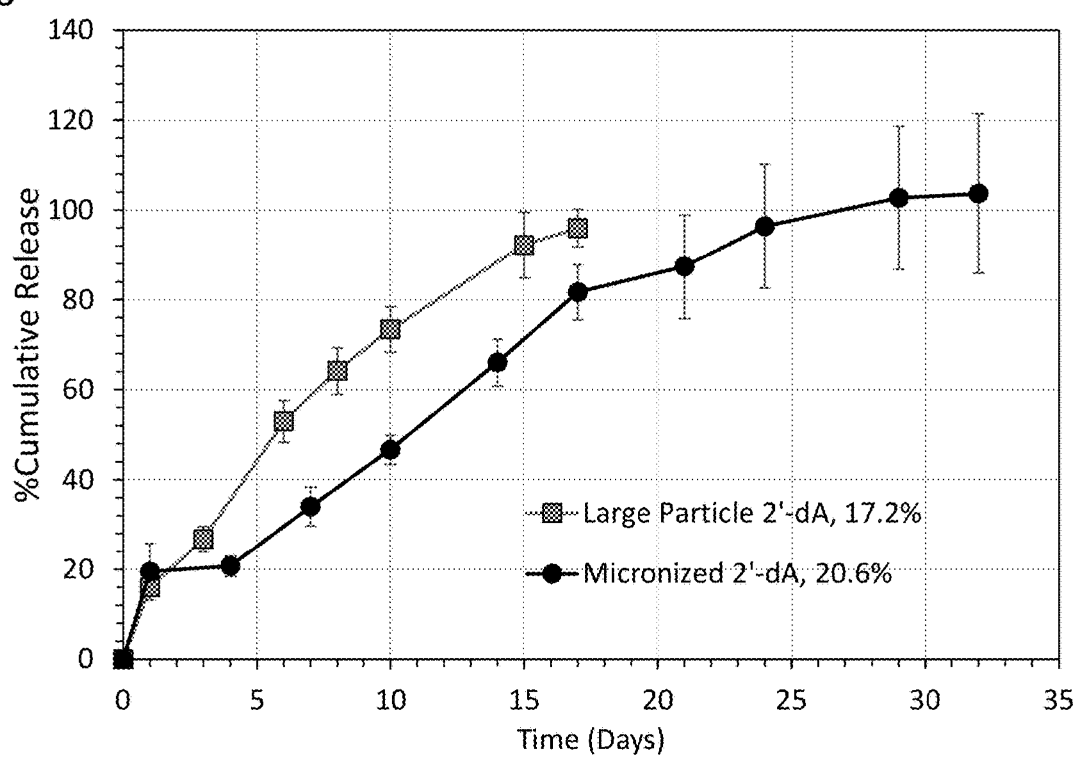
FIG. 16 shows in vitro release curves for PGSU-based microparticles loaded with micronized API or large API particles.

PGSU-based microparticles, loaded with either micronized 2'-deoxyadenosine particles (3-10 μm, FIG. 14A) or large 2'-deoxyadenosine particles (30-100 μm, FIG. 14B), were manufactured by an emulsification-solvent evaporation process. The 2'-deoxyadenosine was suspended in 50% PGS resin in acetone solution. The crosslinker (HDI) and tin catalyst were present in the mineral oil. The PGS:HDI weight ratio was 2:1, and the PGS:tin catalyst weight ratio was 400:1. The acetone phase was emulsified in mineral oil with 3 wt % Span 85 with an overhead stirrer at 800 rpm. The microparticles were cured at 70° C. for 3 hours. FIG. 15A shows an optical microscopy image of the PGSU-based microparticles with micronized particles in mineral oil at the end of 3 hours. FIG. 15B shows an optical microscopy image of the PGSU-based microparticles with large particles in mineral oil at the end of 3 hours. The large API particles can be seen loaded mainly toward the center of the PGSU-based microparticles, and some of the smaller PGSU-based microparticles in FIG. 15B remained unloaded due to the large API particle size. The PGSU-based microparticles in FIG. 15A are more evenly loaded with micronized API. The loaded PGSU-based microparticles were then washed with heptane three times and dried at 40° C. at 10 Torr for 3 days. The micronized API was loaded at 20.6 wt %, whereas the large API was loaded at 17.2 wt %. In vitro release was carried out in 0.1% phosphate-buffered saline (PBS) at pH 7.4 and 37° C. FIG. 16 shows that the micronized API released over a longer period of time than the large API, since they were better loaded in the microparticles.

Figure 17:
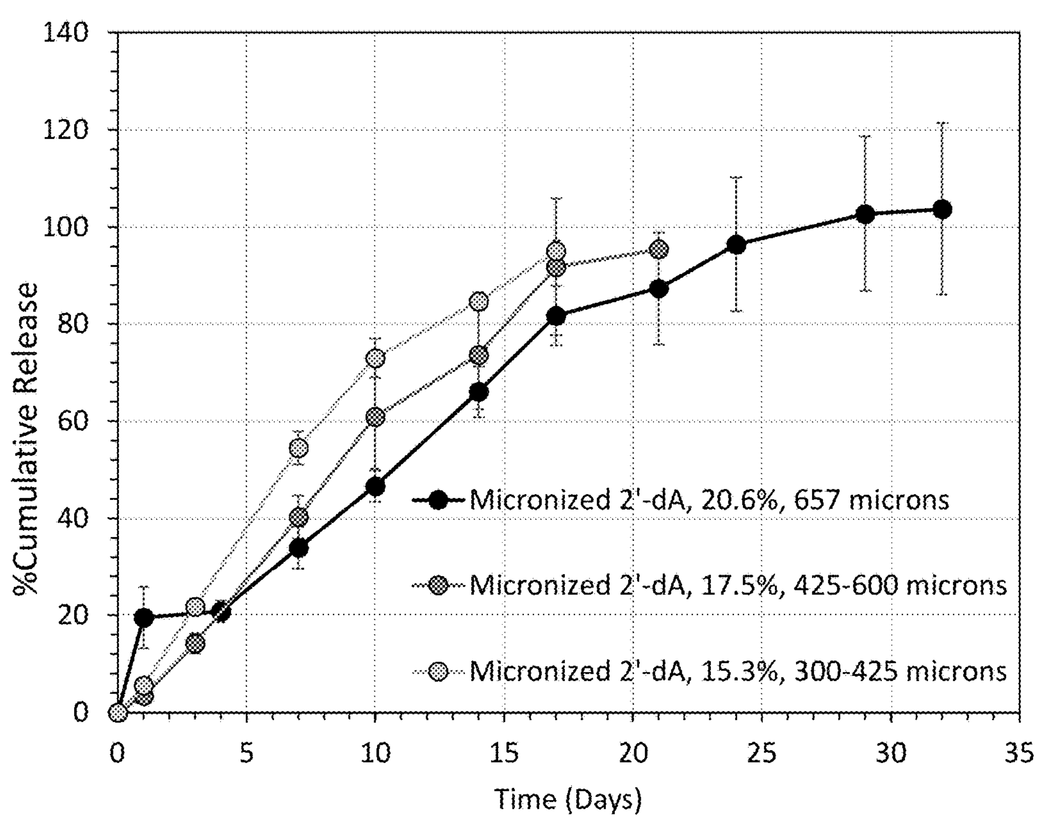
FIG. 17 shows in vitro release curves for PGSU-based microparticles loaded with three different sizes of micronized API.

Micronized 2'-deoxyadenosine was suspended in 50% PGS resin in acetone solution. The crosslinker (HDI) and tin catalyst were present in the mineral oil. The PGS:HDI weight ratio was 2:1, and the PGS:tin catalyst weight ratio was 400:1. The acetone phase was emulsified in mineral oil with 3 wt % Span 85 with an overhead stirrer at 800 rpm. The microparticles were then cured at 70° C. for 3 hours. The resulting 2'-deoxyadenosine-loaded PGSU-based microparticle sample had an average particle size of about 657 μm. Part of the sample was then sieved into two additional samples, one having particle sizes in the range of 300 to 425 μm and the other having particle sizes in the range of 425 to 600 μm. The 657-μm particles had a loading of 20.6 wt %, whereas the 425-600-μm particles had a loading of 17.5 wt %, and the 300-425-μm particles had a loading of only 15.3 wt %. FIG. 17 shows the in vitro release curves in 0.1M PBS at 37° C. Release rate increased with decreasing average particle size of the PGSU-based microparticles.

Example 9

Figure 18:
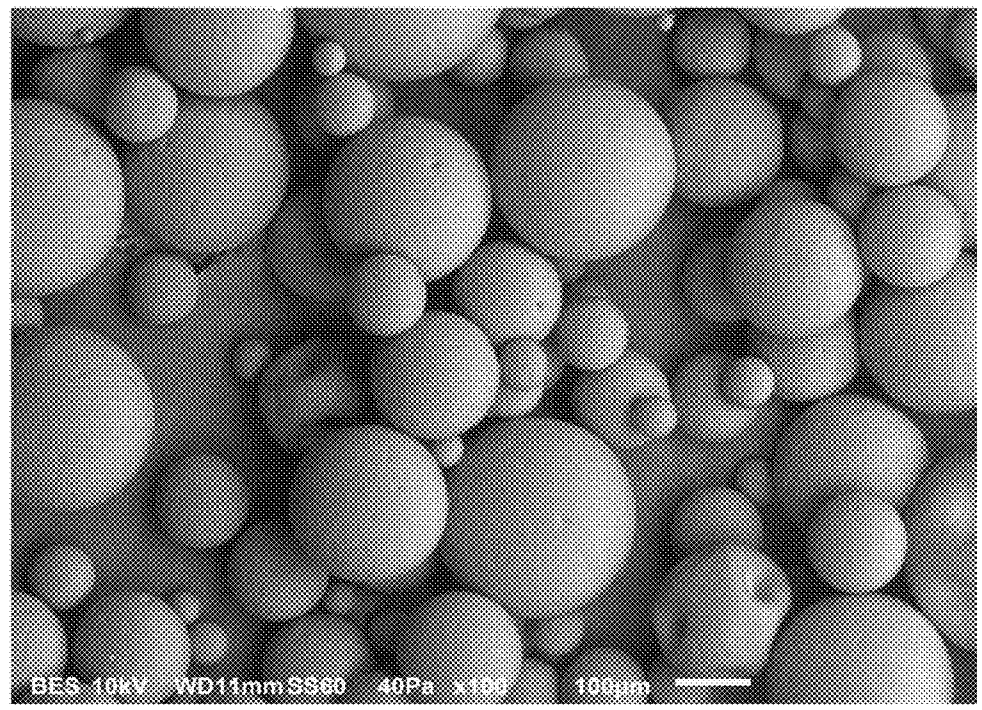
FIG. 18 shows an image of API-loaded PGSU-based microparticles formed by an extrusion-spheronization process.
Figure 19:
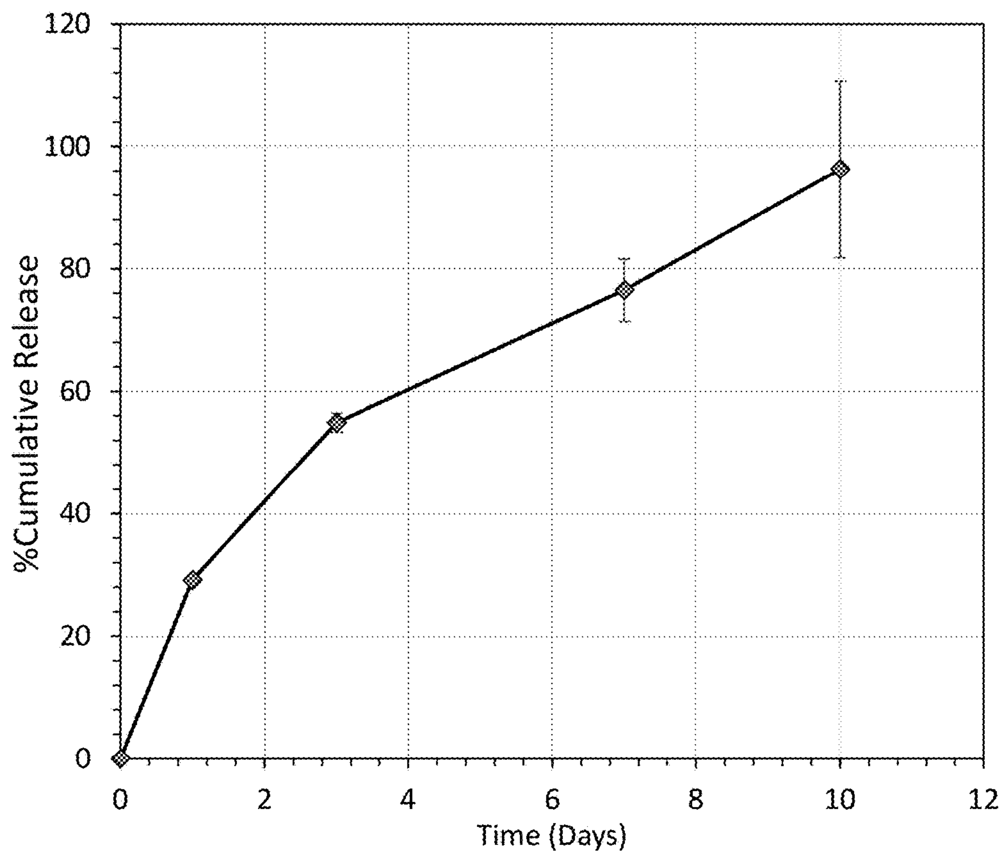
FIG. 19 shows an in vitro release curve for the PGSU-based microparticles of FIG. 18.

PGSU-based microparticles loaded with 23 wt % 2'-deoxyadenosine as a water-soluble API were manufactured by an extrusion-spheronization process. The extruded composition was split between two barrels of a 2:1 volume ratio dual-barrel syringe. The larger barrel of the dual barrel syringe contained two-thirds of the PGS resin, the crosslinker (HDI), and half of the API. The smaller barrel contained one-third of the PGS resin, the tin catalyst, and half of the API. The PGS:HDI weight ratio was 2:1, and the PGS:tin catalyst weight ratio is 400:1. The crosslinker and catalyst were split between the dual barrel syringe and the spheronization bath. The spheronization bath, containing 3% Span 85, crosslinker, and catalyst dissolved in mineral oil, was stirred at 500 rpm at 70° C. The extrudate was added to the spheronization bath with an air cylinder at 5-10 psi. The formed PGSU-based microparticles were cured for 3 hours. The PGSU-based microparticles loaded with 23 wt % 2'-deoxyadenosine were mostly spherical, but some spheroidal particles with some dents were also observed, as shown in FIG. 18. Some API crystals can be seen to cause surface roughness on some of the PGSU-based microparticles. The average particle size of the microparticles was 205 FIG. 19 shows in vitro release of the API in 0.1M PBS at 37° C. from the loaded PGSU-based microparticles, where the API was released completely in 10 days.

Example 10

Figure 20:
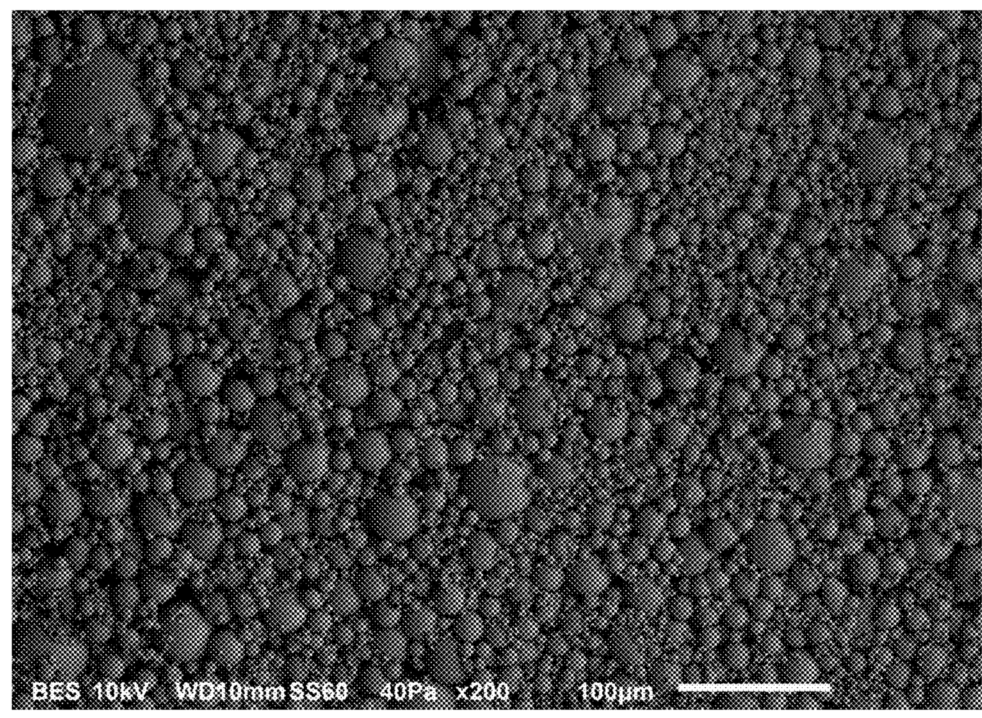
FIG. 20 shows an image of PGSU-based microparticles loaded with 15 wt % phenazone and formed by a membrane emulsification-solvent evaporation process.
Figure 21:
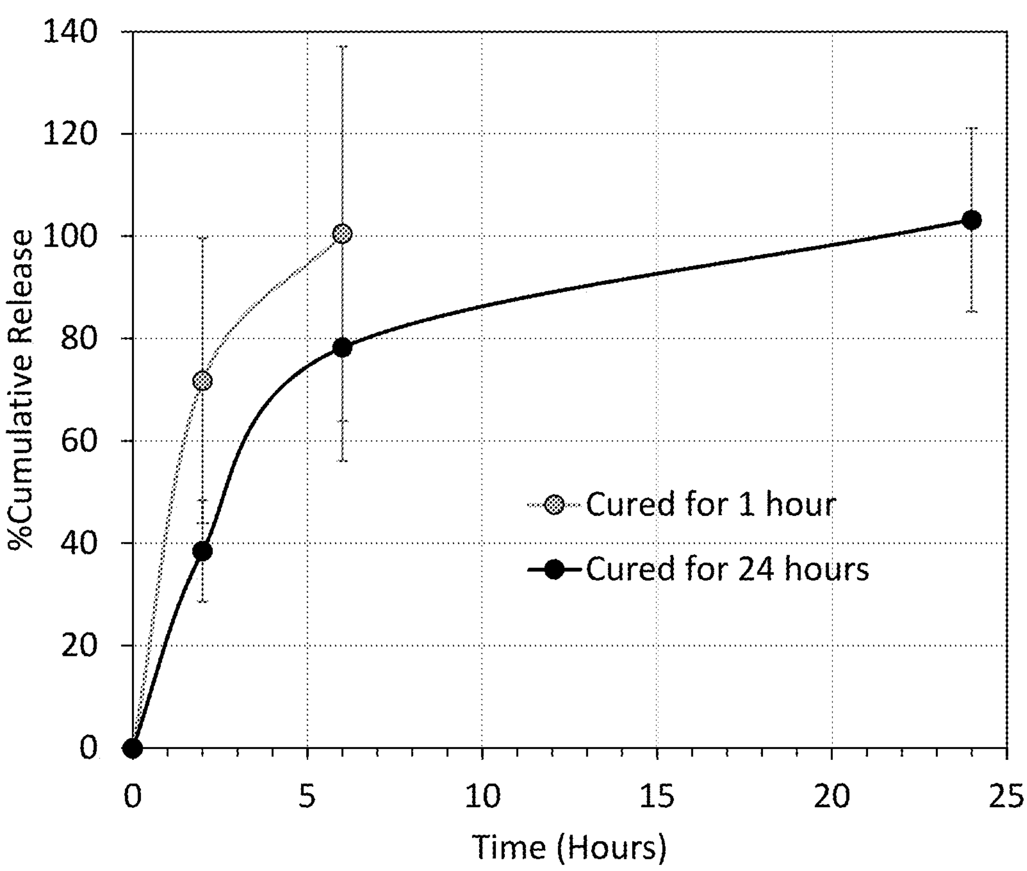
FIG. 21 shows an in vitro release curve for the PGSU-based microparticles of FIG. 20.

PGSU-based microparticles loaded with 15 wt % phenazone as a water-soluble API were manufactured by a membrane emulsification-solvent evaporation process. The formed PGSU-based microparticles loaded with 15 wt % phenazone were spherical with a smooth surface, as shown in FIG. 20. The dispersed phase included the API and 50 wt % PGS in acetone. The continuous phase included 3% Span 85, crosslinker (HDI) at a PGS:HDI weight ratio of 2:1, and catalyst (tin) at a PGS:tin catalyst weight ratio of 400:1 dissolved in mineral oil. The dispersed phase was injected through a 3-μm membrane at a rate of 0.1 mL/min into the continuous phase using an LDC-1 dispersion cell at room temperature. The stirring rate was 1000 rpm. The emulsion was stirred for 4 hours in the dispersion cell at room temperature. The emulsion was then transferred to a beaker and stirred at 70° C. for either 1 hour or 24 hours. The average particle size of the PGSU-based microparticles cured for 1 hour and 24 hours was 9.4 μm and 28.7 μm, respectively. FIG. 21 shows in vitro release of the API in 0.1M PBS at 37° C. from the loaded PGSU-based microparticles. The PGSU-based microparticles cured for 1 hour released completely in 6 hours whereas the ones cured for 24 hours released completely in 24 hours. Increasing the cure time provided a higher crosslinking and slowed down release of the API.

Example 11

Figures 22A, 22B:
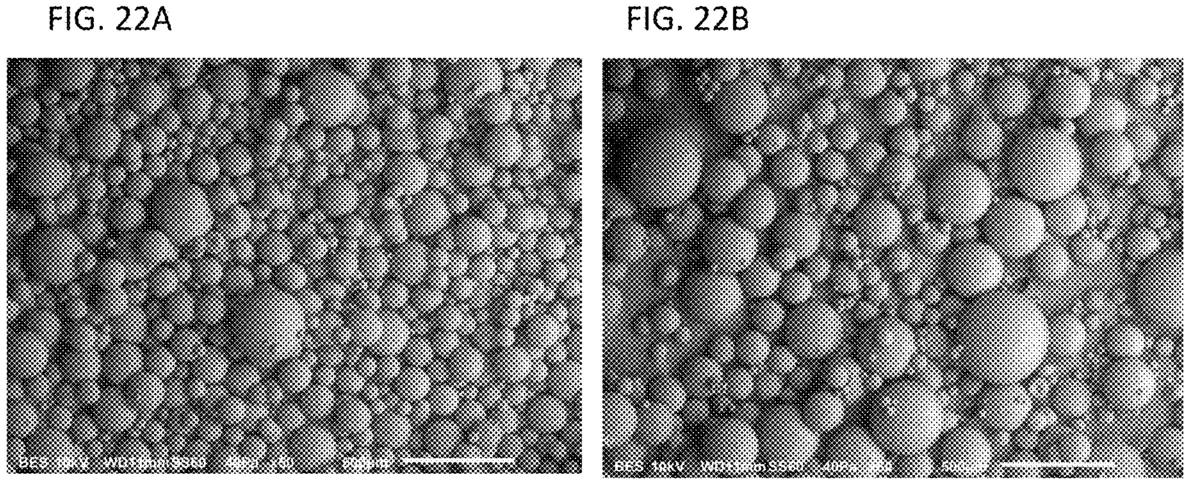
FIG. 22A shows an image of PGSU-based microparticles loaded with 5 wt % dexamethasone and formed by an emulsification-solvent evaporation process.
FIG. 22B shows an image of PGSU-based microparticles loaded with 5 wt % dexamethasone and formed by an extrusion-spheronization process.

PGSU-based microparticles loaded with 5 wt % dexamethasone as a water-insoluble API were manufactured by both an emulsification-solvent evaporation process and an extrusion-spheronization process. The formed PGSU-based microparticles loaded with 5 wt % dexamethasone were spherical with a smooth surface for both the emulsification-solvent evaporation process and the extrusion-spheronization process, as shown in FIG. 22A and FIG. 22B, respectively. The average particle size of the PGSU-based microparticles made by emulsification-solvent evaporation and extrusion-spheronization were 111 μm and 116 μm, respectively.

For the emulsification-solvent evaporation process, the dispersed phase included the API and 30 wt % PGS in acetone. The continuous phase included 5% Span 85, crosslinker (HDI) at a PGS:HDI weight ratio of 2:1, and catalyst (tin) at a PGS:tin catalyst weight ratio of 400:1 dissolved in mineral oil. The dispersed phase-to-continuous phase weight ratio was 1:20. The dispersed phase was added dropwise to the continuous phase at 40° C. while stirring with a magnetic stir bar at 550 rpm. The emulsion was cured for 3 hours at 40° C.

For the PGSU-based microparticles loaded with 5% dexamethasone made by extrusion-spheronization, the extruded composition was split between two barrels of a 2:1 volume ratio dual-barrel syringe. The larger barrel of the dual barrel syringe contained two-thirds of the PGS resin, the crosslinker (HDI), and half of the API. The smaller barrel contained one-third of the PGS resin, the tin catalyst, and half of the API. The PGS:HDI weight ratio was 3.5:1 (NCO:OH stoichiometric ratio of 1:1), and the PGS:tin catalyst weight ratio is 800:1. The crosslinker and catalyst were split between the dual barrel syringe and the spheronization bath. The spheronization bath, containing 5% Span 85, crosslinker, and catalyst dissolved in mineral oil, was stirred at 430 rpm at 100° C. The extrudate was added to the spheronization bath with an air cylinder at a pressure in the range of 5-10 psi. The temperature was lowered to 40° C. after 20 minutes and the formed PGSU-based microparticles were cured for 3 hours.

Figure 23:
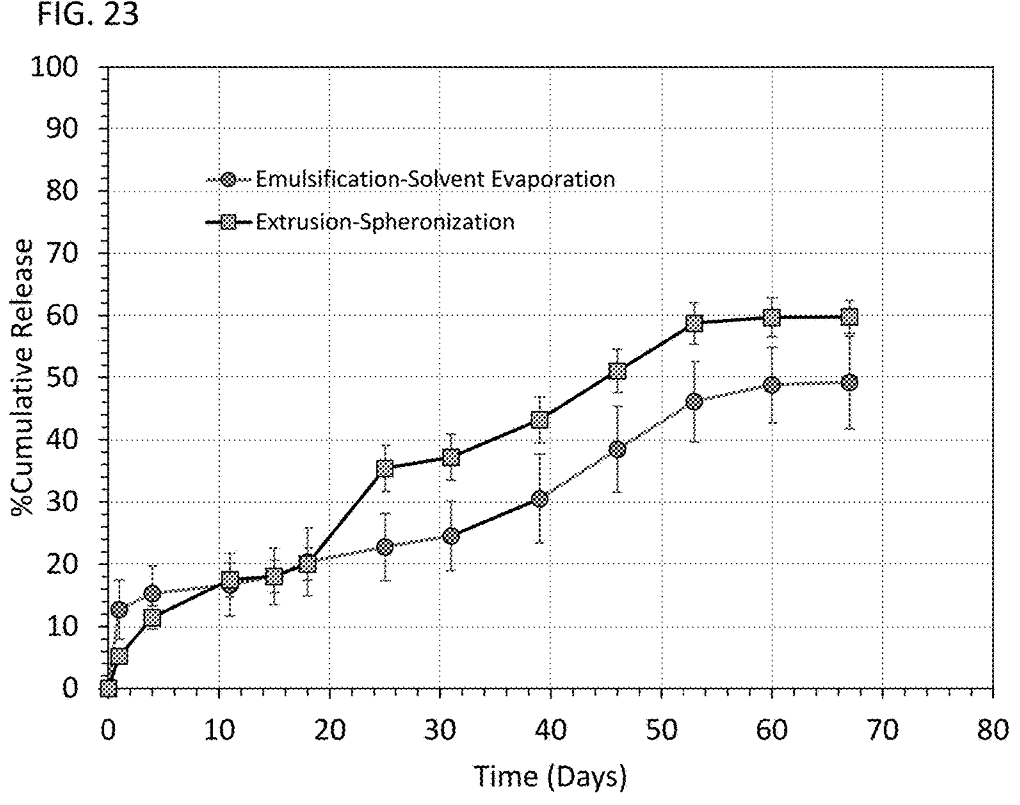
FIG. 23 shows in vitro release curves for the PGSU-based microparticles of FIG. 22A and FIG. 22B.

FIG. 23 shows in vitro release of the API in 0.1M PBS at 37° C. from the loaded PGSU-based microparticles made by emulsification-solvent evaporation and extrusion-spheronization. The PGSU-based microparticles made by emulsification-solvent evaporation released about 49% dexamethasone in 67 days whereas the PGSU-based microparticles made by extrusion-spheronization released 59.8% in 67 days. Hence, longer release times can be achieved with water insoluble APIs at low loadings.

All above-mentioned references are hereby incorporated by reference herein.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims. In addition, all numerical values identified in the detailed description shall be interpreted as though the precise and approximate values are both expressly identified.

What is claimed is:

1. A process of producing poly(glycerol sebacate) urethane (PGSU)-based microparticles, the process comprising:

forming a first composition comprising a poly(glycerol sebacate) (PGS) resin; and dispersing the first composition in a continuous fluid phase in the presence of an isocyanate crosslinker to produce the PGSU-based microparticles;

wherein the crosslinker is present in the continuous phase prior to the dispersing.

2. The process of claim 1, wherein the crosslinker is present only in the continuous fluid phase prior to the dispersing.

3. The process of claim 1, wherein the crosslinker is also present in the first composition prior to the dispersing.

4. The process of claim 1, wherein the dispersing occurs in the presence of a catalyst.

5. The process of claim 4, wherein the catalyst is present, prior to the dispersing, in a location selected from the group consisting of only in the first composition, only in the continuous fluid phase, and in both the first composition and the continuous fluid phase.

6. The process of claim 1, wherein the first composition further comprises an active pharmaceutical ingredient in a form selected from the group consisting of amorphous, semi-crystalline, crystalline, and combinations thereof.

7. The process of claim 1, wherein the PGS resin is present at a concentration in the range of about 40 wt % to about 60 wt % in the first composition, and a ratio of a viscosity of the first composition to a viscosity of the continuous fluid phase is in the range of about 10:1 to about 50:1.

8. The process of claim 1, wherein the PGSU-based microparticles have an average particle size in the range of about 25 μm to about 100 μm and a span value of less than 2.0.

9. The process of claim 1, wherein the process is an emulsification-solvent evaporation process, where the first composition is dispersed as an emulsion in the continuous fluid phase and the continuous fluid phase comprises a continuous phase liquid.

10. The process of claim 9, wherein the first composition further comprises a dispersed phase solvent.

11. The process of claim 10 further comprising removing the dispersed phase solvent after the dispersing.

12. The process of claim 9, wherein the dispersing comprises homogenizing the first composition in the continuous fluid phase.

13. The process of claim 9, wherein the dispersing comprises flowing the first composition through a membrane having a pore size in the range of about 2 to about 15 μm.

14. The process of claim 1, wherein the process is an extrusion-spheronization process, wherein the first composition is an extrudate and the continuous fluid phase is a spheronization bath.

15. The process of claim 14 further comprising producing the extrudate by co-extruding a second composition and a third composition to meet and intermingle to form the first composition.

16. The process of claim 15, wherein the co-extruding comprises co-extruding the second composition from a first barrel and the third composition from a second barrel of a dual-barrel syringe.

17. The process of claim 15, wherein the second composition comprises the crosslinker and the third composition comprises a catalyst.

18. The process of claim 14, wherein the continuous fluid phase comprises mineral oil and further comprising washing the PGSU-based microparticles to remove the mineral oil.

19. The process of claim 14, wherein the extrudate is substantially free of any solvent.

* * * * *